(12) United States Patent
Kwon et al.

(10) Patent No.: US 11,025,770 B2
(45) Date of Patent: Jun. 1, 2021

(54) MOBILE TERMINAL AND ELECTRONIC DEVICE HAVING THE SAME

(71) Applicant: LG ELECTRONICS INC., Seoul (KR)

(72) Inventors: Jungeun Kwon, Seoul (KR); Seongmi Kim, Seoul (KR); Jaewook Kim, Seoul (KR); Daeho Moon, Seoul (KR); Youngshik Shin, Seoul (KR); Jungbin Lee, Seoul (KR); Changho Lee, Seoul (KR); Minhaeng Cho, Seoul (KR); Byungkee Chae, Seoul (KR); Taekyu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/940,167

(22) Filed: Jul. 27, 2020

(65) Prior Publication Data

US 2020/0358896 A1    Nov. 12, 2020

Related U.S. Application Data

(63) Continuation of application No. PCT/KR2019/009604, filed on Aug. 1, 2019.

(30) Foreign Application Priority Data

Feb. 19, 2019 (WO) ................ PCT/KR2019/001996
May 9, 2019 (WO) ................ PCT/KR2019/005597
Jul. 10, 2019 (WO) ................ PCT/KR2019/008516

(51) Int. Cl.
*H04M 1/00* (2006.01)
*H04B 1/3888* (2015.01)
(Continued)

(52) U.S. Cl.
CPC ........ *H04M 1/7246* (2021.01); *H04B 1/3888* (2013.01); *H04M 1/0245* (2013.01);
(Continued)

(58) Field of Classification Search
CPC .. H04M 1/0266; H04M 1/0295; H04M 9/003; H04M 1/72575; H04M 1/0249;
(Continued)

(56) References Cited

U.S. PATENT DOCUMENTS 7,190,977 B2 *   3/2007   Hikishima .......... H04M 1/0245
                                                                455/566
10,534,531 B2 *   1/2020   Seo ....................... G06F 3/0416
(Continued)

FOREIGN PATENT DOCUMENTS

CN    103729160    4/2014
CN    104375887    2/2015
(Continued)

OTHER PUBLICATIONS

PCT International Application No. PCT/KR2019/005598, International Search Report dated Nov. 19, 2019, 10 pages.
(Continued)

*Primary Examiner* — Andrew Wendell
(74) *Attorney, Agent, or Firm* — Lee, Hong, Degerman, Kang & Waimey PC

(57) ABSTRACT

The present disclosure relates to an electronic device comprising a case and a mobile terminal configured to be coupled with the case, where the mobile terminal includes a controller; a connection port provided at one side of the mobile terminal, and a first display, and where the case includes a first body configured to accommodate at least part of the mobile terminal, a connector protruding inward at one side of the first body and configured to engage with the connection port when the mobile terminal is accommodated (Continued)

at the first body, a second body comprising a second display, and a wiring unit electrically connecting the first body and the second body and configured to transfer a signal from the mobile terminal to the second display.

17 Claims, 36 Drawing Sheets

(51) Int. Cl.
  *H04M 1/7246* (2021.01)
  *H04M 1/02* (2006.01)
  *H04M 1/72409* (2021.01)
  *H04M 1/72469* (2021.01)
  *G06F 3/0488* (2013.01)

(52) U.S. Cl.
  CPC ..... *H04M 1/0249* (2013.01); *H04M 1/72409* (2021.01); *H04M 1/72469* (2021.01); *G06F 3/0488* (2013.01)

(58) Field of Classification Search
  CPC ........... H04M 1/72583; H04M 1/0245; H04M 1/72527; H04B 1/3888; H04W 52/027; G06F 3/0488
  See application file for complete search history.

(56) References Cited

U.S. PATENT DOCUMENTS

| | | | |
|---|---|---|---|
| 10,534,534 B2 * | 1/2020 | Cheong | G06F 3/0488 |
| 10,657,926 B2 * | 5/2020 | Shin | G06F 1/1641 |
| 2005/0030255 A1 | 2/2005 | Chiu et al. | |
| 2006/0028395 A1 * | 2/2006 | Nohara | G06F 3/1438 345/1.3 |
| 2008/0318636 A1 | 12/2008 | Kim | |
| 2012/0144323 A1 | 6/2012 | Sirpal et al. | |
| 2012/0194448 A1 | 8/2012 | Rothkopf | |
| 2013/0076614 A1 | 3/2013 | Ive et al. | |
| 2016/0034597 A1 * | 2/2016 | Graf | G06F 9/451 715/761 |
| 2016/0054759 A1 | 2/2016 | Lee et al. | |
| 2016/0103603 A1 | 4/2016 | Sirpal et al. | |
| 2016/0301150 A1 | 10/2016 | Choi et al. | |
| 2017/0052628 A1 * | 2/2017 | Yi | G06F 3/0416 |
| 2017/0153674 A1 * | 6/2017 | Lee | G06F 3/02 |
| 2017/0195708 A1 * | 7/2017 | Morales | H04M 1/72409 |
| 2017/0285906 A1 | 10/2017 | Kim et al. | |
| 2017/0308227 A1 * | 10/2017 | Park | G06F 3/0486 |
| 2018/0095499 A1 | 4/2018 | Sirpal et al. | |
| 2018/0260368 A1 | 9/2018 | Vagell et al. | |
| 2018/0366813 A1 * | 12/2018 | Kim | H04M 1/0266 |
| 2019/0042066 A1 * | 2/2019 | Kim | G06F 1/1618 |

FOREIGN PATENT DOCUMENTS

| | | |
|---|---|---|
| CN | 105141801 | 12/2015 |
| CN | 105278902 | 1/2016 |
| CN | 106210307 | 12/2016 |
| CN | 106372473 | 2/2017 |
| CN | 106529310 | 3/2017 |
| CN | 106993099 | 7/2017 |
| CN | 107463310 | 12/2017 |
| CN | 107508961 | 12/2017 |
| CN | 108279836 | 7/2018 |
| CN | 108681424 | 10/2018 |
| CN | 108897486 | 11/2018 |
| EP | 2442240 | 4/2012 |
| EP | 3413547 | 12/2018 |
| JP | 2018037079 | 3/2018 |
| KR | 1020090132140 | 12/2009 |
| KR | 1020100030387 | 3/2010 |
| KR | 1020110060298 | 6/2011 |
| KR | 1020120092036 | 8/2012 |
| KR | 1020140046319 | 4/2014 |
| KR | 1020140046345 | 4/2014 |
| KR | 1020140085048 | 7/2014 |
| KR | 1020140136771 | 12/2014 |
| KR | 1020150127476 | 11/2015 |
| KR | 1020160012779 | 2/2016 |
| KR | 1020160023471 | 3/2016 |
| KR | 1020160038736 | 4/2016 |
| KR | 1020160075750 | 6/2016 |
| KR | 1020160096731 | 8/2016 |
| KR | 1020170034615 | 3/2017 |
| KR | 101737927 | 5/2017 |
| KR | 1020170093658 | 8/2017 |
| KR | 1020170138869 | 12/2017 |
| KR | 1020180061059 | 6/2018 |
| KR | 1020190001822 | 1/2019 |

OTHER PUBLICATIONS

PCT International Application No. PCT/KR2019/005597, International Search Report dated Nov. 19, 2019, 11 pages.
PCT International Application No. PCT/KR2019/005648, International Search Report dated Nov. 19, 2019, 12 pages.
PCT International Application No. PCT/KR2019/009604, International Search Report dated Nov. 19, 2019, 11 pages.
PCT International Application No. PCT/KR2019/001996, International Search Report dated Nov. 19, 2019, 10 pages.
PCT International Application No. PCT/KR2019/008516, International Search Report dated Apr. 10, 2020, 10 pages.
The State Intellectual Property Office of the People's Republic of China Application Serial No. 201980005738.8, Office Action dated Feb. 3, 2021, 7 pages.
The State Intellectual Property Office of the People's Republic of China Application Serial No. 201980046008.2, Office Action dated Mar. 29, 2021, 15 pages.
European Patent Office Application Serial No. 19842772.6, Search Report dated Apr. 7, 2021, 9 pages.
The State Intellectual Property Office of the People's Republic of China Application Serial No. 201980045233.4, Office Action dated Apr. 13, 2021, 12 pages.

* cited by examiner (a)

(b)

(c)

(a)

(b)

MOBILE TERMINAL AND ELECTRONIC DEVICE HAVING THE SAME

CROSS-REFERENCE TO RELATED APPLICATIONS

This application is a continuation of International Application No. PCT/KR2019/009604, filed on Aug. 1, 2019, and also claims the benefit of earlier filing date and right of priority to International Application Nos. PCT/KR2019/001996, filed on Feb. 19, 2019, PCT/KR2019/005597, filed on May 9, 2019 and PCT/KR2019/008516, filed on Jul. 10, 2019 the contents of which are all hereby incorporated by reference herein in their entirety.

The present disclosure relates to a mobile terminal and an electronic device having a case to which the mobile terminal is coupled, and a control method thereof.

BACKGROUND

Terminals may be divided into mobile/portable terminals and stationary terminals according to mobility. Also, the mobile terminals may be classified into handheld types and vehicle mount types according to whether or not a user can directly carry them.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Recently, many mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

In order to use such various functions more efficiently, the usability of the mobile terminal has been extended by implementing the mobile terminal to interlock with an external device. In this case, the mobile terminal and the external device interlocking with the mobile terminal may preferably operate independently or in a cooperative manner, if necessary, in order to improve user convenience and usability.

On the other hand, when the structure of the product is changed to expand the usability of the mobile terminal, research and production considering compatibility with various models are needed.

SUMMARY

One aspect of the present disclosure is to provide a mobile terminal capable of expanding a display area thereof by coupling the mobile terminal and a case having an additional display unit cooperating with the mobile terminal, and an electronic device having the case coupled with the mobile terminal.

Another aspect of the present disclosure is to provide a mobile terminal capable of controlling a display unit provided on a case in a wired/wireless communication manner, so as to be compatible with various models and exclude the use of a separate chip for communication, and an electronic device having the case coupled with the mobile terminal.

In addition, still another aspect of the present disclosure is to provide a mobile terminal capable of using a display unit provided thereon and a display unit additionally provided on a case in an independent manner or an interlocking manner, and performing operations appropriate for various status changes, so as to expand usability and satisfy convenience in use, and an electronic device having the case coupled with the mobile terminal.

To achieve those aspects and other advantages of the present disclosure in accordance with preferred embodiments, there is provided an electronic device including a mobile terminal and a case to which the mobile terminal is coupled. Here, the mobile terminal may include a terminal body coupled with the case, a connection port provided in one side of the terminal body, a first display unit coupled to the case, and memory. The case may include a first body configured to accommodate at least part of the terminal body, a connector disposed on one side of the first body and protruding toward inside of the first body to be inserted into the connection port when the terminal body is accommodated, a second body on which the second display unit is disposed, and a wiring unit electrically connecting the first body and the second body so that a signal received from the mobile terminal is transferred to the second display unit. A controller of the mobile terminal may detect a state in which the connector and the connection port are connected to each other, transmit a signal for switching the second display unit to an active state to the second display unit when a preset touch is detected on any one of the first display unit and the second display unit while the first display unit is activated, generate in a memory a sub stack in which a task related to screen information to be output to the second display unit is inserted.

In one embodiment, when a preset touch is detected on the second display unit while the screen information corresponding to the task inserted into the sub stack is displayed on the second display unit, the controller of the mobile terminal may transmit a control signal for switching the second display unit from the active state to the inactive state, and delete the sub stack when the second display unit is switched to the inactive state.

In one embodiment, the controller of the mobile terminal may generate a second main stack in which a task related to a first application is inserted, in response to an execution of the first application using a first home screen page displayed on the first display unit, while a first main stack for the first home screen page is maintained, generate a second sub stack in which a task related to a second application is inserted, in response to an execution of the second application using a second home screen page displayed on the second display unit, while a first sub stack for the second home screen page is maintained, display first screen information corresponding to the task inserted into the second main stack, and transmit an image signal corresponding to second screen information, corresponding to the task inserted into the second sub stack, to the second display unit through the wiring unit, so that the second screen information is displayed on the second display unit.

In one embodiment, the controller of the mobile terminal may controls the memory so that a task corresponding to the first screen information included in the second main stack is inserted into the second sub stack, in response to reception of an input for expanding a size of the first screen information displayed on the first display unit. The controller of the mobile terminal may expand the size of the first screen information, display a first part of the expanded first screen information on the first display unit, and transmit an image signal corresponding to a remaining second part of the expanded first screen information to the second display unit through the wiring unit, so that the second part of the expanded first screen information is displayed on the second display unit.

In one embodiment, the controller of the mobile terminal may reduce the size of the expanded first screen information to be displayed on the first display unit, delete the task corresponding to the first screen information from the second sub stack, and transmit an image signal corresponding to the second screen information to the second display unit through the wiring unit, in response to reception of an input for restoring the size of the expanded first screen information while the expanded first screen information is displayed over the first and second display units.

In one embodiment, the controller of the mobile terminal may delete the task included in the second main stack, insert the deleted task into the second sub stack, and transmit an image signal corresponding to the first screen information to the second display unit through the wiring unit, so that screen information corresponding to the task related to the first screen information is output to the second display unit, in response to reception of an input for moving the first screen information displayed on the first display unit to the second display unit.

In one embodiment, the controller of the mobile terminal may delete the task included in the second sub stack, insert the deleted task into the second main stack, and display the second screen information on the first display unit, in response to reception of an input for moving the second screen information displayed on the second display unit to the first display unit.

In one embodiment, the controller of the mobile terminal may delete the second sub stack when it is determined that there is not any task included in the second sub stack after the deletion of the task included in the second sub stack, and then transmit an image signal corresponding to a second home screen page to the second display unit, so that the second home screen page corresponding to the task included in the first sub stack is displayed on the second display unit.

In one embodiment, the controller of the mobile terminal may insert the task related to the first screen information into the second sub stack and transmit an image signal corresponding to the first screen information to be output on the second display unit to the second display unit through the wiring unit, while the first screen information is displayed on the first display unit, in response to reception of an input for mirroring the first screen information displayed on the first display unit to the second display unit.

In one embodiment, the controller of the mobile terminal may change an execution depth of the first application based on a touch input applied to the first screen information displayed on the first display unit, display third screen information of the first application corresponding to the changed execution depth on the first display unit, insert a task related to the third screen information into the second main stack while the task related to the first screen information is maintained in the second sub stack.

In one embodiment, the memory may include a third main stack including execution tasks that tasks included in the second main stack are configured in application units, and a third sub stack including execution tasks that tasks included in the second sub stack are configured in application units. The controller of the mobile terminal, in response to reception of an input for moving an execution screen of an application selected from a list screen, corresponding to the execution tasks included in the third main stack, to the second display unit while the list screen is displayed on the first display unit, may perform alignment for the second and third main stacks so that only tasks related to the selected application are deleted from the second and third main stacks for the first display unit, insert the tasks related to the selected application into the second and third sub stacks, and transmit an image signal corresponding to the execution screen of the selected application to the second display unit through the wiring unit so that the execution screen of the selected application is output to the second display unit.

In one embodiment, the controller of the mobile terminal, in response to reception of a touch input applied to one execution screen in the list screen displayed on the first display unit while the execution screen of the selected application is displayed on the second display unit, may perform alignment such that a task related to the execution screen to which the touch input has been applied is located on top of the second and third main stacks, and display the execution screen to which the touch input has been applied on the first display unit.

In one embodiment, the second body may be provided with a third display unit on a front side thereof. The first display unit and the second display unit may have a closed state in which the first display unit is covered by the second display unit and an open state in which the first display unit is not covered by the second display unit. The controller of the mobile terminal may transmit a signal for outputting information related to an event on the third display unit to the third display unit through the wiring unit when it is detected that the event related to at least one application occurs in the closed state.

In one embodiment, the controller of the mobile terminal, in response to switching from the closed state to the open state while the information related to the event is displayed on the third display unit in the closed state, may activate the second display unit, transmit a signal for outputting screen information corresponding to the event on the activated second display unit to the second display unit through the wiring unit, and generate the second and third sub stacks for the second display unit simultaneously at a time point when the switching to the open state is detected.

As described above, in a mobile terminal and an electronic device having the mobile terminal according to the present disclosure, more convenient and easier screen control and access can be realized by utilizing a plurality of displays.

In detail, each of the screens displayed on a plurality of displays can be independently controlled, and also the plurality of displays can be used as one expanded display. In addition, a screen can be moved (sent) from one display to another or different execution depths of the same application can be simultaneously confirmed and entered based on a mirroring function.

Events can be confirmed even in a closed state of the electronic device and also information corresponding to the event can be provided as soon as the electronic device being switched to an open state. Various opened states realized by a plurality of displays can be detected so as to provide operation modes useful for a user, thereby improving usability and satisfying user convenience at the same time.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
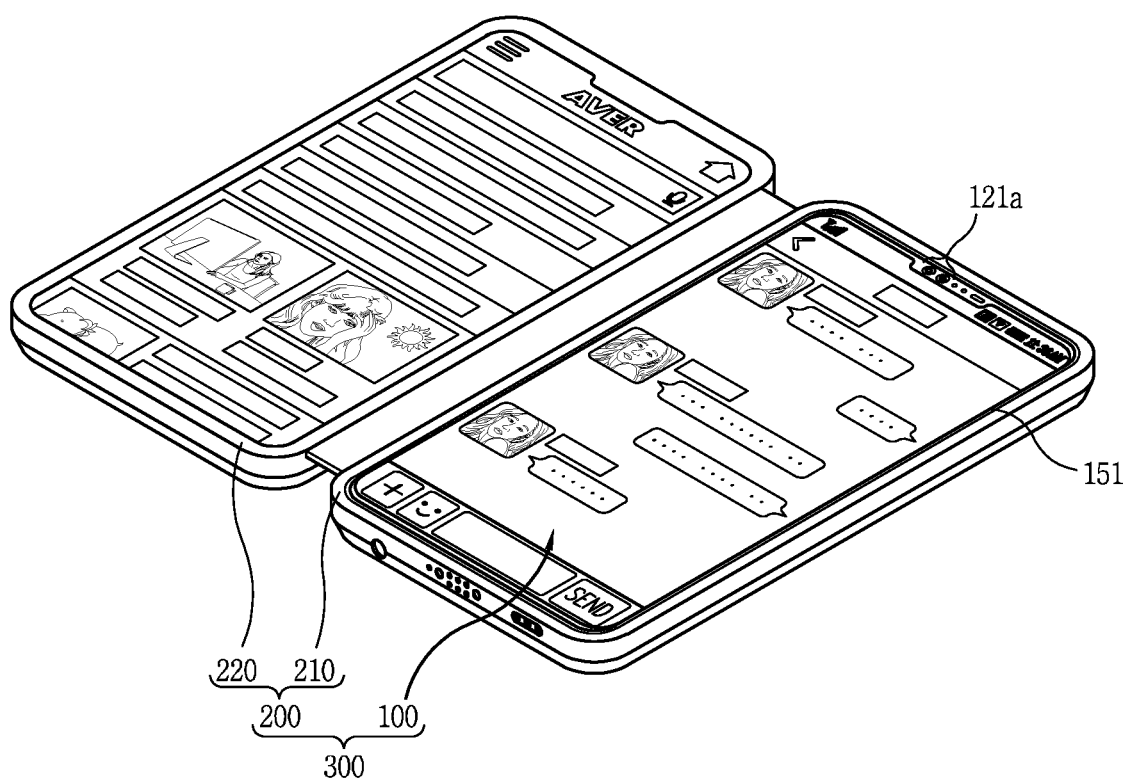
FIGS. 1A and 1B are conceptual views illustrating an electronic device in accordance with the present disclosure.
Figure 1B:
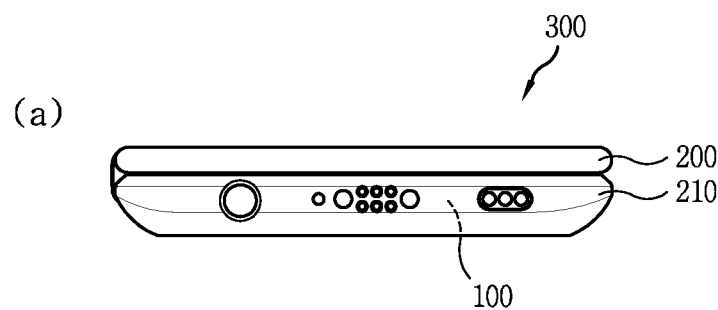
Figure 1B:
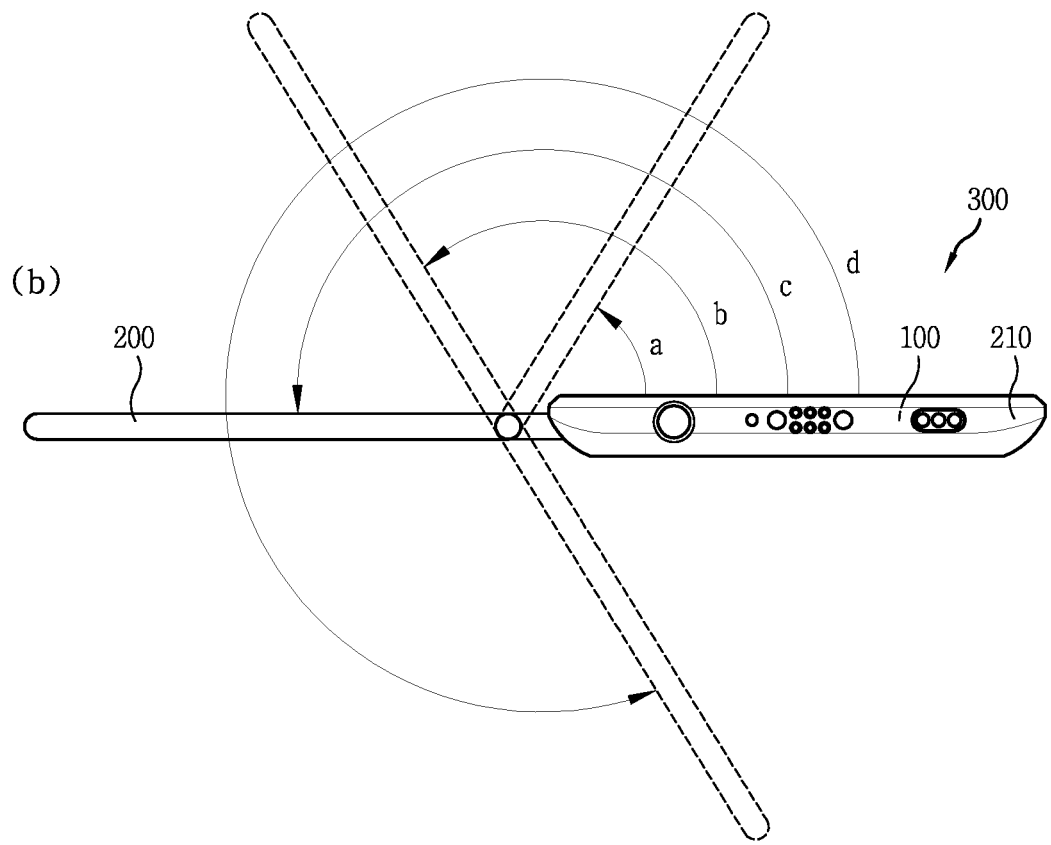
Figure 1B:
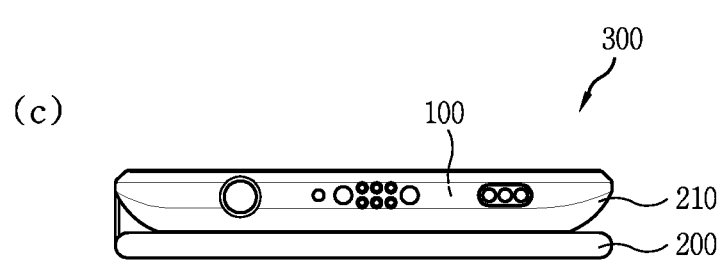

FIGS. 1A and 1B are conceptual views illustrating an electronic device in accordance with the present disclosure.

Referring to the drawings, a mobile terminal 100 is coupled to a case 200. The mobile terminal 100 and the case 200 are coupled to realize one electronic device 300.

In this case, mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, and head mounted displays (HMDs)), and the like. Detailed description of the mobile terminal will be given later with reference to FIG. 3.

The case 200 may be a pouch for protecting the appearance of the mobile terminal 100 or covering or accommodating at least one surface of the mobile terminal 100 as an accessory of the mobile terminal 100. The case 200 may be coupled with the mobile terminal 100 to expand the functions of the mobile terminal 100.

Meanwhile, in the present disclosure, information output from the mobile terminal may be processed in association with the structure or function of the case 200. For example, referring to FIG. 1A, the case 200 may include a display unit (hereinafter, referred to as "second display unit 250") that cooperates with a display unit (hereinafter, referred to as "first display unit 151") of the mobile terminal.

The case has first and second bodies 210 and 220 that are connected to be rotatable relative to each other, and the second display unit 250 may be disposed on one of the first and second bodies 210 and 220.

For example, the first body 210 may be formed to accommodate to couple with at least a portion of the body of the mobile terminal (terminal body). The rear side of the mobile terminal is accommodated in the first body 210 and the first display unit 151 disposed on the front side of the mobile terminal is externally exposed.

In addition, at least one hole may be provided on one side of the first body 210 so that at least some of the components of the mobile terminal are externally exposed from the case and accessible to perform functions when the mobile terminal 100 is coupled to the case.

In this case, the mobile terminal 100 may be detachably coupled to the first body 210. In addition, the mobile terminal may be configured to detect whether it is coupled with the first body 210. For the detection, the first body 210 may include a magnet 245 (see FIG. 4) on one surface thereof which faces the mobile terminal 100, and the mobile terminal 100 may include a hall sensor 143 (see FIG. 4) provided on a rear side thereof to sense a magnetic field corresponding to the magnet 245 when the terminal body is coupled to the first body. When the magnetic field is sensed by the hall sensor 143, the mobile terminal may recognize that it is coupled to the case and perform a preset control.

For example, when the magnetic field is sensed by the hall sensor, the controller 180 of the mobile terminal 100 may perform 'preparation process' to a state in which an operating current can be supplied to the second display unit 250 provided on the second body 220 or a signal can be transmitted to the second display unit 250. That is, the preset control may refer to an operation related to the preparation process.

Here, the 'preparation process' refers to a standby state in which the controller of the mobile terminal 100 can immediately perform a next process as long as an operating current is supplied to the second display unit 250. Therefore, even though the magnetic field is sensed by the hall sensor, a current may not be immediately supplied to the second display unit 250.

Meanwhile, when it is detected that a connector provided on one side, for example, a lower end of the first body 210 is coupled to a connection port provided in a lower end of the mobile terminal accommodated in the first body 210, the controller 180 of the mobile terminal may control the operating current to be supplied to the second display unit 250 provided on second body 220.

In detail, the operating current may be supplied to a printed circuit board of the second display unit 250 from a battery of the mobile terminal 100 through a wiring unit, for example, a cable, which is connected to a flexible printed circuit board (FPCB) connected through the connector and is provided on a connection unit 230 of the case 200.

To this end, the controller 180 of the mobile terminal may recognize resistors Ra and Rd provided in the first body 210 through a specific contact pin of the connector provided in the first body 210, detect the coupled state between the connector and the connection port, and supply the operating current accordingly. This will be described in more detail below.

The second display unit 250 provided in the second body 220 may be configured to operate based on power supplied from the mobile terminal 100.

The second display unit 250 may be disposed on the second body 220 to perform a function of extending a display area of the first display unit 151 or to be driven independent of the first display unit 151. For example, contents related to information output to the first display unit 151 may be mirrored to be output to the second display unit 250.

In addition, execution screens of different applications may be output to the first and second display units 151 and 250, respectively. As another example, an execution screen of one application may be divided to be output to the first and second display units 151 and 250, respectively. In addition, screens corresponding to different execution steps or different tasks of one application may be output to the first and second display units 151 and 250, respectively.

Furthermore, the mobile terminal 100 is configured to control screen information output to the second display unit 250. For this purpose, a communication link, for example, a USB (Universal Serial Bus) 2.0 communication link, for wired communication may be set between the mobile terminal 100 and the second display unit 250.

Meanwhile, the first and second display units 151 and 250 may be externally exposed together in an open state, and the open state may be defined with reference to FIG. 1B.

Referring to FIG. 1B, the first and second bodies 210 and 220 of the case 200 may be rotatable relative to each other between a closed state of shown in (a) of FIG. 1B and a flip state shown in (c) of FIG. 1B.

The closed state is a state shown in (a) of FIG. 1B, namely, a state in which the second body 220 of the case 200 covers the first display unit 151 of the mobile terminal 100, and the first display unit 151 is obscured by the second body 220. That is, a state in which the first display unit 151 is covered by the second display unit 250 may be referred to as the closed state. In the closed state, the mobile terminal 100 and the case 200 overlap each other in a thickness direction of the mobile terminal, and thus has a shape like a closed book, thereby enhancing portability of a user.

In the closed state, the terminal body of the mobile terminal 100 accommodated in the first body 210 may not be externally exposed. In addition, in the closed state, a sub display unit 250a for displaying notification information corresponding to a specific event occurring in the mobile terminal 100 may be exposed at one side of the front of the second body 220 provided with the second display unit 250.

The second body 220 may be rotated with respect to the first body 210 to be switched to the open state.

The open state is a state in which the first display unit is not obscured by the second display unit 250. The open state refers to one in which a specific angle between the first body and the second body is an angle other than 0 degrees.

For the purposes of this discussion and by way of example, as illustrated in (b) of FIG. 1B, the open state may be one of 'first state' in which the first and second display units 151 and 250 form about 60 degrees with each other, shown by angle "(a)", and 'second state' in which the first and second display units 151 and 250 form about 120 degrees with each other, shown by angle "(b)", and 'third state' in which the first and second display units 151 and 250 form 180 degrees with each other, shown by angle "(c)", and 'fourth state' in which the first and second display units 151 and 250 form about 270 degrees with each other, shown by angle "(d)".

In the open state, the first and second bodies 210 and 220 may be fixed at a specific angle to be in any one of the first to fourth states, and a fixing member for fixing this state may be provided on the case 220.

The controller 180 of the mobile terminal may control a different operation mode to be activated in one of the first to fourth states.

For example, 'privacy protection mode' may be executed in the first state and 'laptop mode' may be executed in the second state. In addition, 'display expansion mode' may be executed in the third state and 'multi-display mode' may be executed in the fourth state.

A state in which the first and second display units 151 and 250 are externally exposed is defined as 'open state'. In the 'open state', the first display unit 151 is not covered by the second display unit 250. Therefore, a state where the first display unit 151 is covered by the second display unit 250 is defined as 'closed state'. The distinction between the open state and the closed state may be performed based on, for example, a sensing value of an illuminance sensor provided on a front surface of the first display unit 151.

Meanwhile, as illustrated in (c) of FIG. 1B, a state where the first and second display units 151 and 250 are rotated relative to each other by 360 degrees so that the rear surface of the second body 220 having the second display unit 250 completely covers the rear surface of the first body 210 having the first display unit 151 may be defined specifically as a 'flip state', as well as being a configuration of an open state. In the 'flip state', the first and second display units 151 and 250 are exposed to face opposite directions.

The flip state may be detected by recognizing a state where those components provided on the rear surface of the mobile terminal 100 coupled to the first body 210, for example, a rear camera 121b, an optical output module 154, a flash 124, and a user input unit 123a are covered by the rear surface of the second body 220.

The first to fourth states and the flip state may also be detected by a separate sensor provided on the connection unit 230 for coupling the first and second bodies 210 and 220 to be rotatable relative to each other, or separate sensors provided on the rear surfaces of the first and second bodies 210 and 220.

The electronic device 300 of the present disclosure may perform an operation of controlling the first and second display units 151 and 250 in cooperation with the open state and the closed state. For example, in the closed state, the first display unit 151 and the second display unit 250 may be driven in an inactive state. On the other hand, when the closed state is switched to the open state, at least one of the first display unit 151 and the second display unit 250 may be activated.

As an example, when the closed state is switched to the open state, both the first display unit 151 and the second display unit 250 may be switched to an active state. In this case, different home screen pages may be output to the first and second display units 151 and 250, respectively, or the same home screen page may be displayed over the first and second display units 151 and 250. In addition, various information may be output to the first and second display units 151 and 250 according to situations.

As another example, when the closed state is switched to the open state, the first display unit 151 may be switched to an active state, and the second display unit 250 may be maintained in an inactive state.

The second display unit 250 may include a touch sensor configured to sense a touch applied to the second display unit 250. In addition, the second display unit 250 may be configured to sense a touch even in the inactive state.

In relation to touch sensing of the touch sensor, when a touch applied to the second display unit 250 corresponds to a preset type of touch in the open state, the second display unit 250 may be activated. Alternatively, the second display unit 250 may be activated, in response to a touch applied to the first display unit 151 in the open state.

Meanwhile, when a touch is applied to the second display unit 250, the second display unit 250 may transmit a touch signal corresponding to the touch to the mobile terminal 100. When the touch according to the received touch signal corresponds to a preset type of touch, the mobile terminal 100 may transmit a signal corresponding to a control command for activating the second display unit 250 to the second display unit 250.

Then, the second display unit 250 may be activated based on the signal received from the mobile terminal 100.

The signal transmission and reception may be performed in a wired communication manner as the connector provided on the one side of the first body 210 and the connection port provided in the mobile terminal 100 are coupled to each other.

Hereinafter, the structure of the case for implementing the operation of the electronic device will be described in more detail.

Figure 2A:
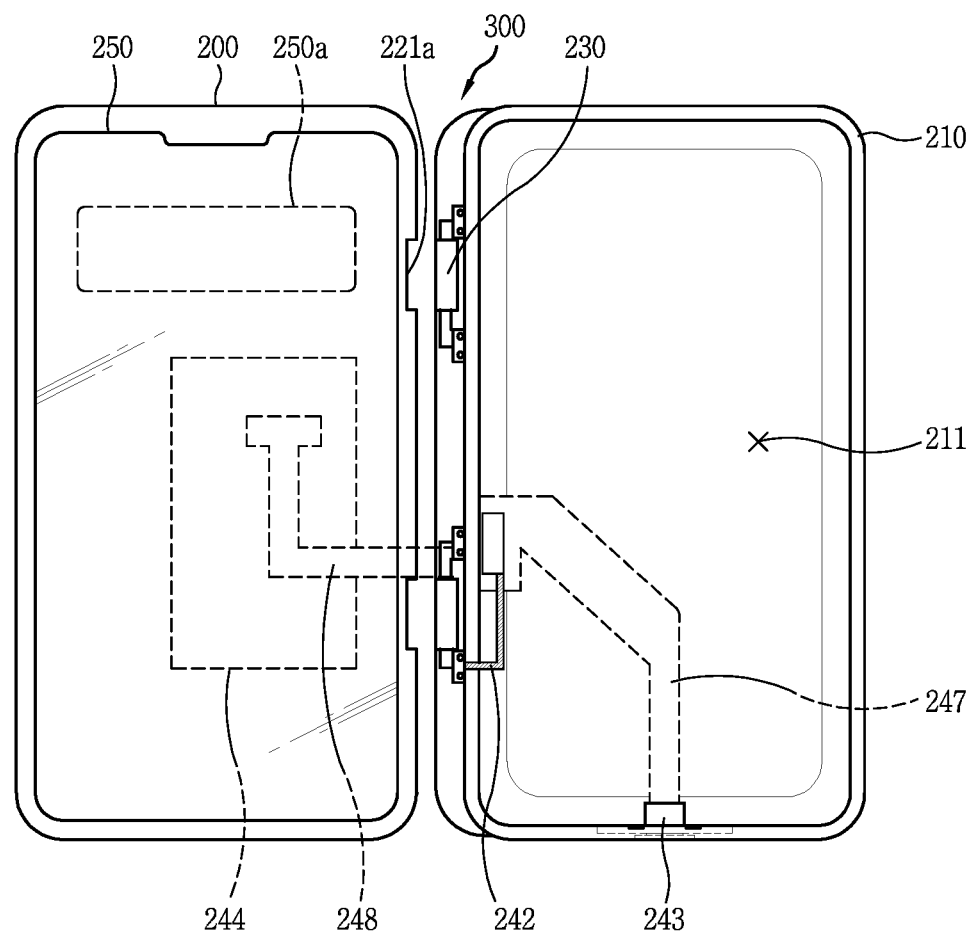
FIGS. 2A, 2B, 2C, and 2D are conceptual views illustrating a main structure of an electronic device in accordance with the present disclosure.

Referring to FIG. 2A, the first body 210 of the case 200 includes an accommodation space 211 in which the rear surface of the terminal body is accommodated. The first body accommodates at least a portion of the mobile terminal in the accommodation space 211, and the rear surface of the mobile terminal is disposed on a bottom surface of the accommodation space 211.

The second body 220 on which the second display unit 250 is disposed is rotatably coupled to the first body 210 by the connection unit 230. That is, the connection unit 230 is disposed between the first and second bodies 210 and 220 to couple the first and second bodies 210 and 220 to be rotatable relative to each other.

The second body 220 may be provided with a sub display unit 250a on its front side (corresponding to the side externally exposed in the closed state) for displaying predetermined information, for example, time information, event notification, or the like. In this case, brief event notification can be immediately confirmed through the sub display unit 250a in the closed state without switching the electronic device 300 to the open state.

Referring to FIGS. 2A to 2D, the second body 220 may include a first cover 221, a second cover 222, and the second display unit 250. An accommodation groove 221a may be formed in the first cover 221 to accommodate at least a portion of the connection unit 230. In addition, the second cover 222 may be coupled to the first cover 221 and may serve as a frame to which various electronic components are mounted. As an example, the second cover 222 may be equipped with a flexible printed circuit board (FPCB) 248 of the second display unit 250 to be described later.

The second cover 222 may be rotatably coupled to the connection unit 230, and provided with a groove 222a formed at a position corresponding to the accommodation groove 221a of the first cover 221. The connection unit 230 may be disposed in the groove 222a. In this case, the second display unit 250 may be mounted to the second cover 222.

In addition, a wiring unit 242, for example, a cable is provided inside the connection unit 230, and is connected to a flexible printed circuit board (FPCB) 247 provided on the rear side of the first body 210, so that a signal transmitted from the controller of the mobile terminal is transferred to the second display unit 250.

Hereinafter, a flexible printed circuit board (FPCB) provided on the rear side of the first body 210 and connected to the wiring unit 242 of the connection unit 230 will be referred to as 'first flexible printed circuit board (FPCB)' 247. In addition, a flexible printed circuit board (FPCB) provided on the rear side of the second body 220 and connected to the wiring unit 242 of the connection unit 230 will be referred to as 'second flexible circuit board (FPCB)' 248.

The connection unit 230 may include first and second hinges 231 and 232 spaced apart from each other along a side surface of the first body 210. Each of the first and second hinges 231 and 232 may include a hinge body 233 and a hinge shaft 234.

A hinge groove (not shown) is formed in the hinge body 233, and the hinge shaft 234 is inserted into the hinge groove so that the first and second bodies 210 and 220 can rotate relative to each other. The hinge shaft 234 may be provided in plural, and provided with coupling portions 235 on one side thereof so as to be coupled to the first and second bodies 210 and 220, respectively.

In addition, the connection unit 230 is provided therein with the wiring unit 242, for example, the cable, which is coupled to the first and second FPCBs 247 and 248.

On one side of the first body 210 may be provided a connector 243 protruding inward toward the accommodation space 211, in which the mobile terminal is accommodated, and configured to be inserted into a connection port provided at one side of the terminal body. To this end, for example, at least one hole H through which at least a portion of a connector module including the connector 243 is inserted may be formed through one side of a side surface of a lower end of the first body 210.

Although not shown in the drawing, the connector 243 may be formed to be rotatable by 180 degrees to face another direction toward the outside of the case, or may be formed to be pulled out of or pushed into the case by an external force. The terminal body may be easily accommodated in the first body 210 with or without the connector 243 present.

Alternatively, in one example, the first body 210 may be formed to be separated in half in a vertical or horizontal direction to allow insertion of the mobile terminal body, or at least an upper part or a lower part of the first body 210 may be removed, or at least an upper part or a lower part of the first body may be formed of a flexible material so that the terminal body can be easily accommodated in the first body 210.

A connector module including the connector 243 may be mounted at one side, for example, a lower central portion of the first body 210. The connector 243 may be provided on one end of the connector module, and a charging port having female pogo pins to be coupled to external male pins, or vice versa, may be provided on another end of the connector module.

The connector 243 may be connected to a circuit board 244, which is provided to control the second display unit 250, via the first and second FPCBs 247 and 248 and the wiring unit 242. In addition, the connector 243 may be connected to the circuit board 244 by being coupled with the connection port of the terminal body. Here, the connection port provided in the terminal body may mean, for example, a USB port.

The second display unit 250 performs wired communication with the mobile terminal 100 through the first and second FPCBs 247 and 248, the wiring unit 242, and the circuit board 244, which are coupled to the mobile terminal 100 through the connector 243. In addition, the mobile terminal 100 performs wired communication with the second display unit 250 through the connection port connected to the connector 243. In this regard, the connection port 161 of the mobile terminal 100 may be referred to as 'first wired communication unit' and the connector 243 of the case may be referred to as 'second wired communication unit'.

In some embodiments for example, the first wired communication unit 161 and the second wired communication unit 243 may perform USB (Universal Serial Bus) communication. The first wired communication unit 161 (see FIG. 2B) may perform USB I/O communication to transmit a signal to the case through the second wired communication unit 243 (see FIG. 2B). Also, the second wired communication unit 243 may perform USB I/O communication to transmit a signal to the mobile terminal through the first wired communication unit 161. Here, the USB I/O communication may mean USB standards such as the USB 2.0 or USB 3.0 communication.

USB is a common connector and is defined as an interface specification that enables connection of various peripheral devices. In the USB, a host always exists, and communication is performed through the medium of the host.

Figure 2B:
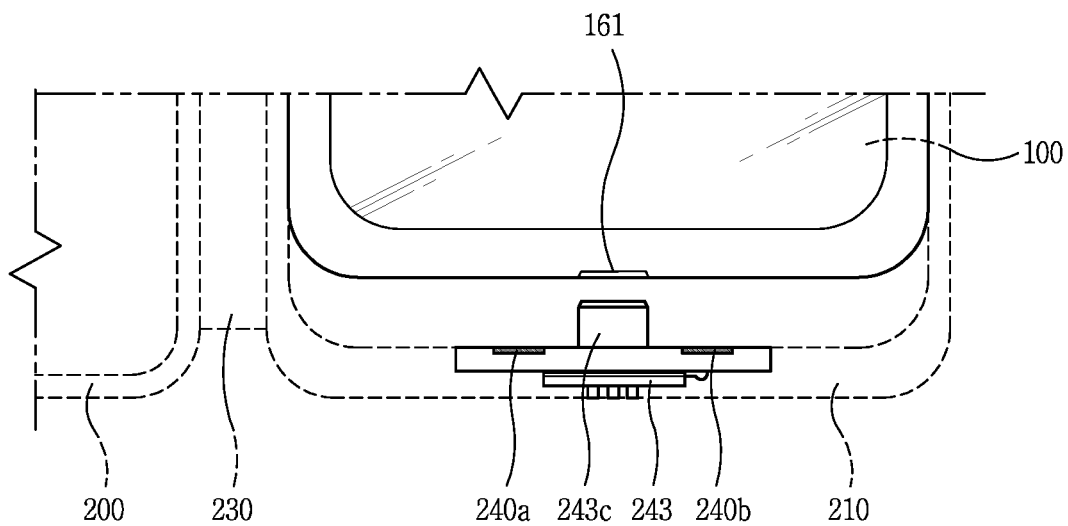
Figure 2C:
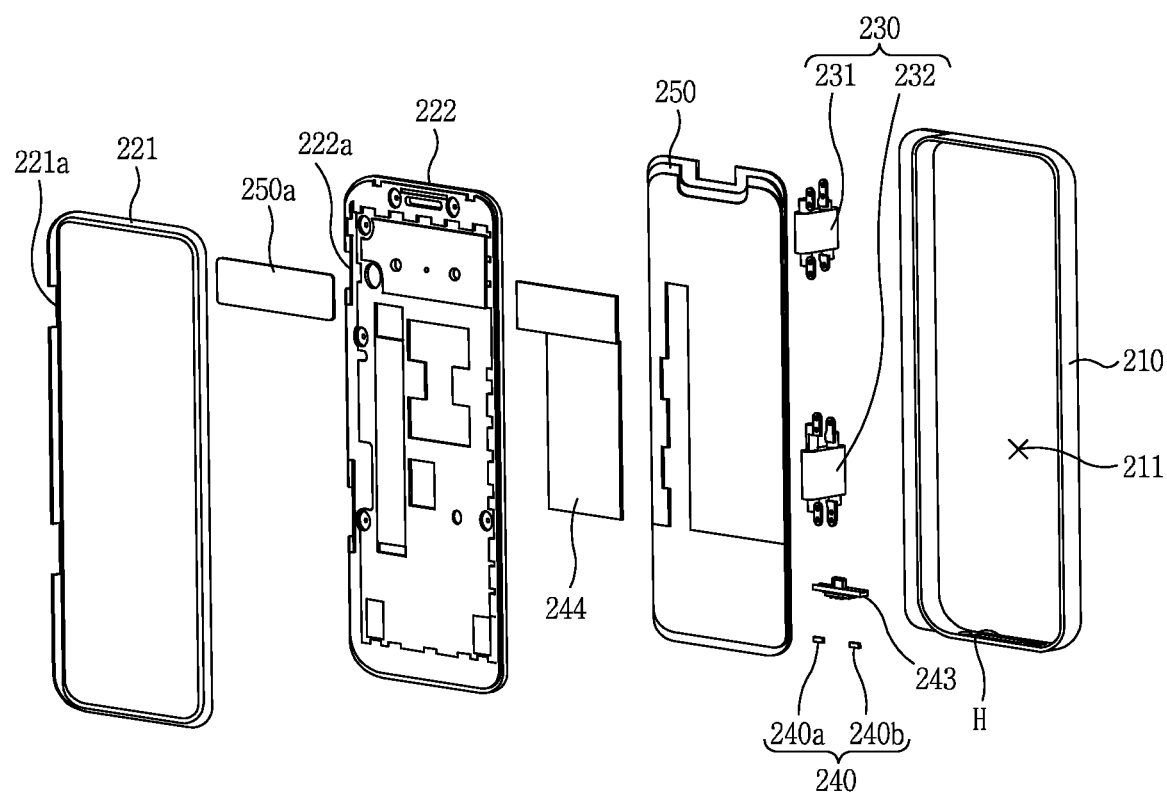
Figure 2D:
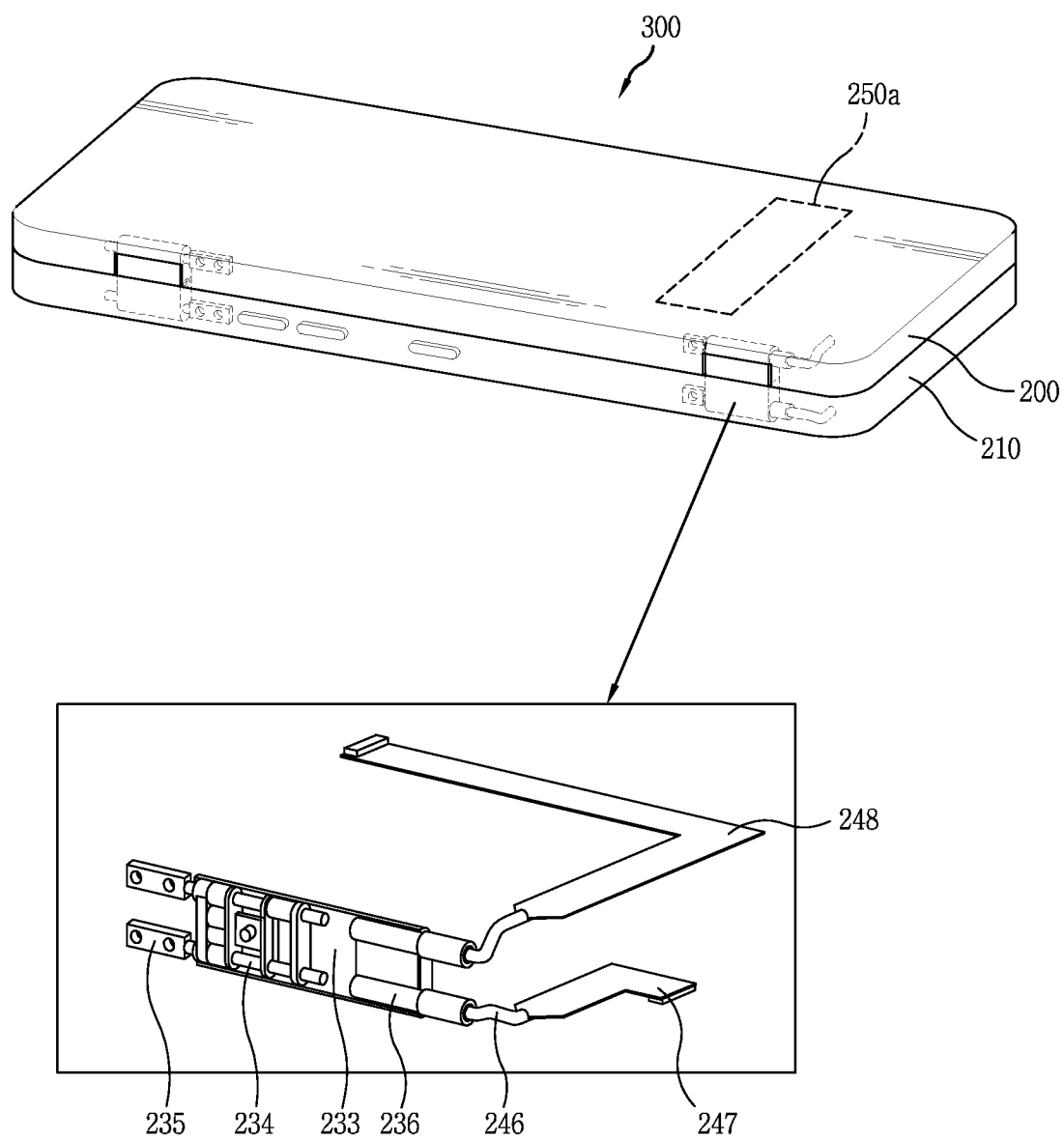

Referring to FIG. 2B, the connector 243 provided on the lower end of the first body 210 of the case and connected to the connection port of the mobile terminal may be mounted to the connector module. One end of the connector 243 may be bonded to a supporting member of the connector module, and another end may form a protrusion 243c. The connector 243 is connected to the connection port of the mobile terminal as the protrusion 243c is inserted into the mobile terminal.

In one example, a plurality of contact pins (e.g., male pins) is provided inside the connector, and each of the plurality of contact pins may be set to perform a specific function when being connected to pins (e.g., female pins) of the connection port of the mobile terminal. This will be described in more detail below.

On the other hand, referring to FIG. 2A, the first body 210 is provided with a first FPCB 247 connected to the connector 243. The first FPCB 247 may be connected to the second FPCB 248 of the second display unit 250 and the circuit board 244 through the wiring unit 242, for example, the cable inside the connection unit 230.

In some examples, the first body 210 does not have a separate circuit board for wireless communication except for the first FPCB 247, allowing the thickness of the first body 210 to be thin. Accordingly, the compatibility of a mobile terminal mountable to the case can be further improved, and the overall thickness of the electronic device can be made thinner.

Referring to the drawings, the first and second bodies 210 and 220 are electrically connected to the circuit board 244 through the wiring unit 242 coupled with the first and second FPCBs 247 and 248. The circuit board 244 may be connected to the second display unit 250 to perform a function of transferring a signal received from the mobile terminal 100 to the second display unit 250.

That is, the circuit board 244 may transfer data, which is received from the mobile terminal through the first wired communication unit 161 and the second wired communication unit 243, to the second display unit 250.

The wiring unit 242 electrically connects the first and second bodies 210 and 220 through the connection unit 230. For this connection, the connection unit 230 may be provided with a connection passage along which the wiring unit 242 is laid.

For example, accommodation spaces are formed in the first and second hinges 231 and 232 to accommodate at least a part of the wiring unit 242. For example, the wiring unit 242, which is connected to the first FPCB 247 coupled to the second wired communication unit 243, may be accommodated in the second hinge 232. In addition, the first and second hinges 231 and 232 may be formed in a symmetrical structure/shape.

The first and second wired communication units 161 and 243 may be disposed on the lower sides of the mobile terminal 100 and the case 200, respectively. In this case, the first FPCB 247 connected to the wiring unit 242 may also be connected to one of the first and second hinges 231 and 232 from the lower side.

In addition, the second hinge 232 may include an extension portion 236 extending from the hinge body 233, and the extension portion 236 may be provided with cables 246 extending to the first body 210 and the second body 220, respectively. The accommodation spaces are formed in the extension portion 236, and the cables 246 are accommodated in the accommodation spaces. First and second FPCBs 247 and 248 are disposed at ends of both the cables 246, and the first and second FPCBs 247 and 248 are electrically connected to the circuit board 244, respectively. With this structure, a signal for controlling the second display unit 250 can be transmitted from the mobile terminal to the first body 210 and the second body 220 through the first and second wired communication units 161 and 243.

Meanwhile, referring to the drawings, the connector 243 which is connected to the mobile terminal so that the second display unit 250 and the circuit board 244 can get power from the mobile terminal may be disposed on the lower end of the first body 210 of the case. The connector 243 supplies power of the mobile terminal to the circuit board 244 through the first FPCB 247, the wiring unit 242, and the second FPCB 248, and the circuit board 244 transfers the power to the second display unit 250.

According to this structure, the power supplied to the second display unit 250 and the signal transmitted to the second display unit 250 may be transmitted from the mobile terminal through the wired path.

According to the structure, the electronic device performs an operation of controlling the first and second display units 151 and 250 in a cooperating manner by using the wired communication and the wired power supply path. Hereinafter, the structure and functions of the mobile terminal will be described in detail, and then the control operation will be described.

Figure 3A:
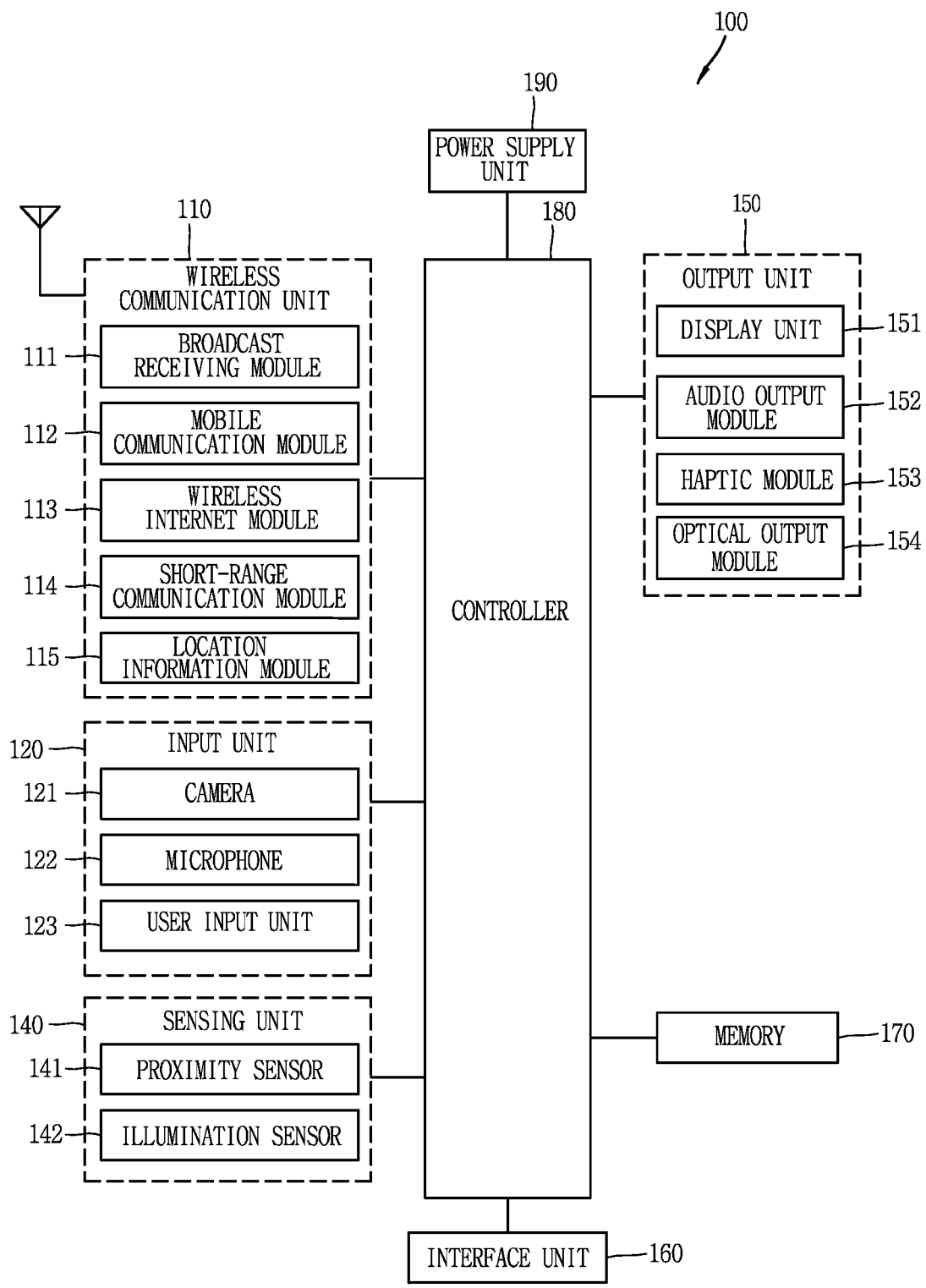
FIGS. 3A, 3B, and 3C are conceptual views illustrating an example of a mobile terminal related to the present disclosure.
Figure 3B:
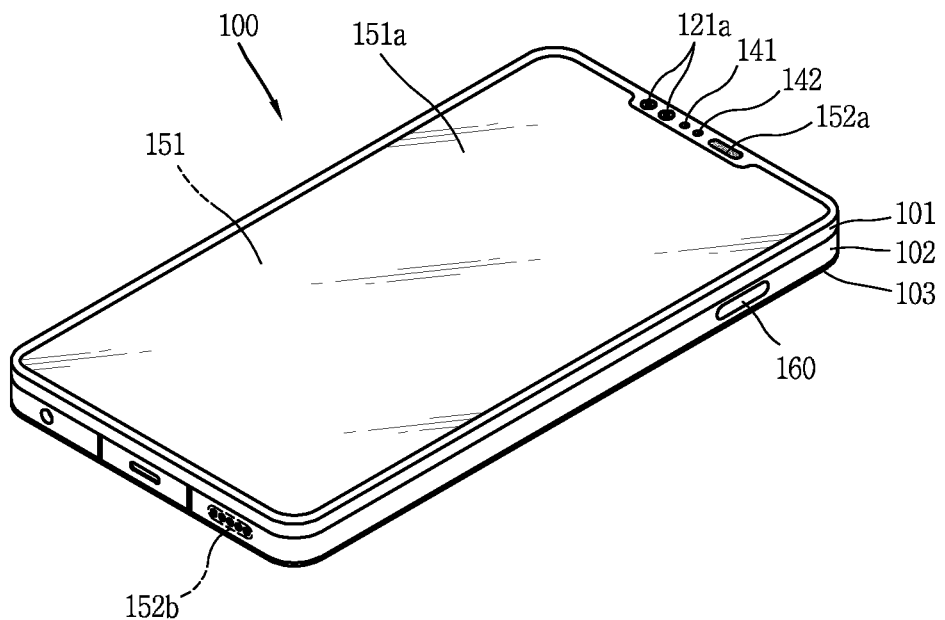
Figure 3C:
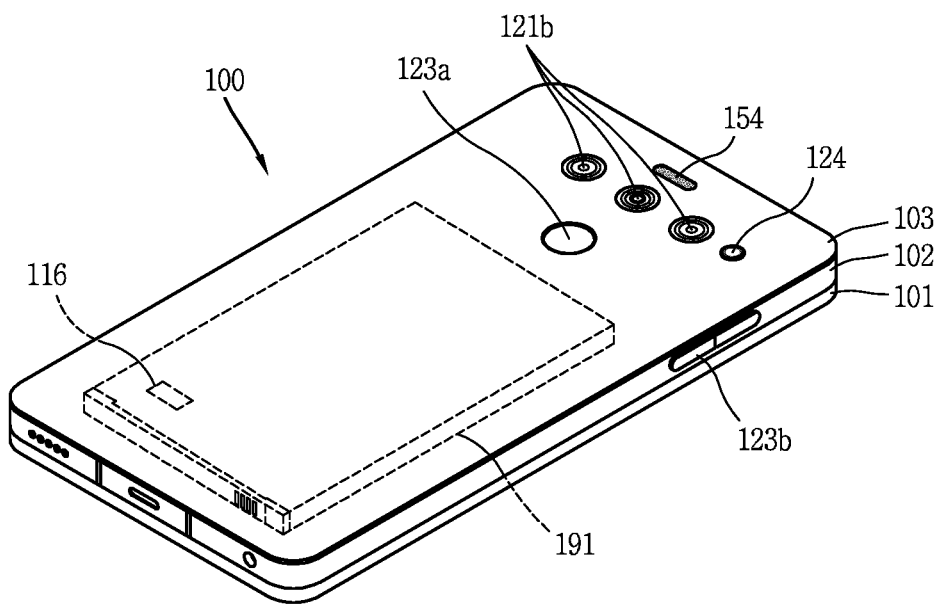

FIGS. 3A, 3B, and 3C are conceptual views illustrating an example of a mobile terminal related to the present disclosure. The mobile terminal 100 according to the present disclosure may be coupled on the case of the electronic device.

Referring to FIGS. 3A to 3C, FIG. 3A is a block diagram of a mobile terminal in accordance with one exemplary embodiment of the present invention, and FIGS. 3B and 3C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 3A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 3A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, a corresponding signal(s) may be transmitted to a touch controller. The touch controller may process the received signals, and then transmit corresponding data to the controller 180. Accordingly, the controller 180 may sense which area of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition. In some embodiments, the controller 180 may be implemented as one or more software components, however in other embodiments, the controller 180 is implemented in one or more hardware components, such as a central processing unit (CPU) or processor.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 3B and 3C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a concept referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are accessible.

As illustrated, when the rear cover 103 is coupled to the rear case 102, a side surface of the rear case 102 may partially be exposed. In some cases, upon the coupling, the rear case 102 may also be completely shielded by the rear cover 103. The rear cover 103 may include openings for externally exposing a camera 121b, an optical output module 154, a flash 124, a rear input unit 123a, and the like.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to form a water-tight seal of an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, a first manipulation unit, a second manipulation unit 123b, a microphone 122, an interface unit 160, and the like.

Hereinafter, as illustrated in FIGS. 3B and 3C, description will be given of the exemplary mobile terminal 100 in which the front surface of the terminal body is shown having the display unit 151, the first audio output module 152a, the proximity sensor 141, the illumination sensor 142, and the first camera 121a, the side surface of the terminal body is shown having the second manipulation unit 123b, the second audio output module 152b, the microphone 122, and the interface unit 160, and the rear surface of the terminal body is shown having the optical output module 154, the rear input unit 123a, the second camera 121b, and the flash 124.

However, those components may not be limited to the arrangement discussed herein, and those of ordinary skill in the art will appreciate and consider alternate embodiment configurations not specifically disclosed herein. Some components may be omitted or rearranged or located on different surfaces. For example, any manipulation unit may not be located on the front surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in the form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 3A). In some cases, the touch screen may replace at least some of functions of the manipulation unit.

The first audio output module 152a may be implemented as a speaker for transmitting a call sound to a user's ear and the second audio output module 152b may be implemented as a loud speaker for outputting various alarm sounds or multimedia sounds.

The window 151a of the display unit 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151, transmitted, or stored in the memory 170.

The first manipulation unit and the second manipulation unit 123b are examples of the user input unit 123, which may be manipulated by a user to provide input to the mobile terminal 100. The first manipulation unit and the second manipulation unit 123b may also be commonly referred to as a manipulating portion. The first manipulation unit and the second manipulation unit 123b may employ any method if it is a tactile manner allowing the user to perform manipulation with a tactile feeling such as touch, push, scroll or the like. The first manipulation unit and the second manipulation unit 123b may also be manipulated through a proximity touch, a hovering touch, and the like, without a user's tactile feeling.

For example, the first manipulation unit may be configured with a mechanical key, or a combination of a touch key and a push key. In addition, the first manipulation unit may be configured in a layered form with a fingerprint sensor.

The content received by the first manipulation unit and the second manipulation unit 123b may be set in various ways. For example, the first manipulation unit may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit 123a may be disposed on the rear surface of the terminal body. The rear input unit 123a may be manipulated by a user to input a command for controlling an operation of the mobile terminal 100. The content input may be set in various ways. For example, the rear input unit 123a may be used by the user to input a command, such as power on/off, start, end, scroll or the like, controlling a volume level being output from the first or second audio output module 152a or 152b, switching into a touch recognition mode of the display unit 151, or the like. The rear input unit 123a may be implemented to receive a touch input, a physical push input, or a combination thereof.

The rear input unit 123a may be disposed to overlap the display unit 151 of the front surface in a thickness direction of the terminal body. As one example, the rear input unit 123a may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit that would be located on the front surface of the terminal body. Accordingly, when the first manipulation unit is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 3A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 3A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

On the other hand, the electronic device according to the present disclosure is configured to perform a power supply and wired communication for transmission and reception of various signals by connecting the connection port, namely, the first wired communication unit 161 of the interface unit 160 provided in one side (for example, the lower end of the side surface) of the mobile terminal, and the connector, namely, the second wired communication unit 243 provided on one side of the first body 210 of the case 200.

Herein, as aforementioned, in one embodiment the wired communication is performed by using the USB I/O interface specification. However, the present disclosure is not limited thereto, and other interface specifications for communication may be applied.

Figure 4:
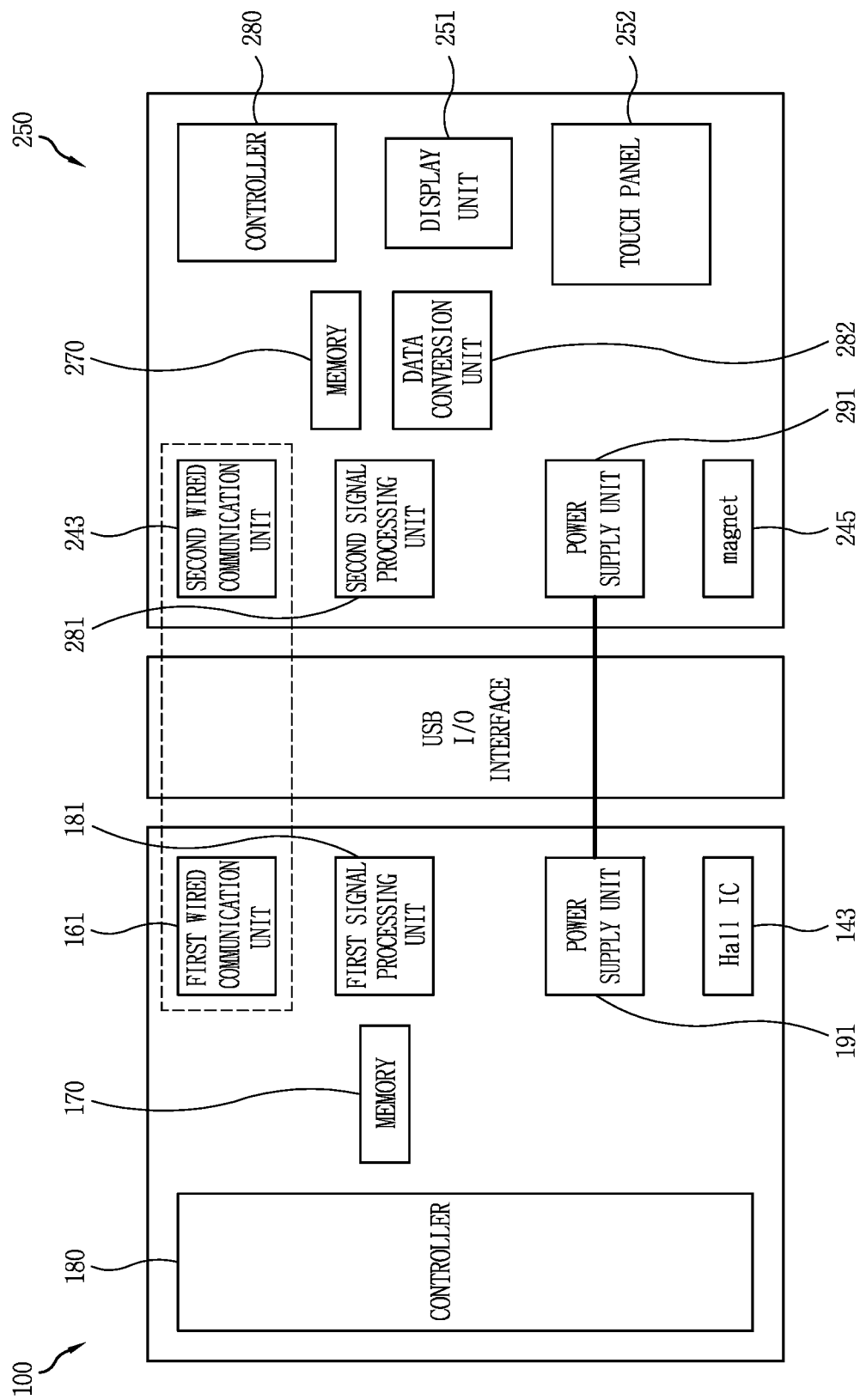
FIG. 4 is a conceptual view illustrating a control method between a display unit provided on a mobile terminal and a display unit provided on a case, in an electronic device in accordance with the preset disclosure.

Hereinafter, a method of performing communication between the first and second wired communication units 161 and 243 will be described in more detail with reference to the accompanying drawings. FIG. 4 is a conceptual view illustrating a control method between a display unit provided on a mobile terminal and a display unit provided on a case, in an electronic device in accordance with the preset disclosure.

The mobile terminal 100 according to the present disclosure may be coupled to the first body 210. When the mobile terminal 100 is coupled to the first body 210, the connector 243 provided on the first body 210 is inserted into the connection port provided in the mobile terminal 100. Accordingly, the wired communication can be performed through the first and second wired communication units 161 and 243.

In this case, the first body 210 of the case may serve as a host device of the mobile terminal, so as to perform wired communication, for example, USB communication with the mobile terminal 100.

The first wired communication unit 161 provided in the mobile terminal 100 may be included in the interface unit 160 described above with reference to FIG. 3A. The interface unit 160 includes a plurality of contact pins and is configured to identify a host device connected to the contact pins by the controller 180 of the mobile terminal.

The first wired communication unit 161 may be provided in a side surface of a lower end of the mobile terminal 100. In addition, the second wired communication unit 243 may be provided to correspond to a position where it comes in contact with the first wired communication unit 161 when the mobile terminal 100 is accommodated in the first body 210 of the case. That is, the second wired communication unit 243 may be provided on a side surface of a lower end of the first body 210.

In the present disclosure, when the mobile terminal 100 is accommodated in the first body 210 and the connector pins of the second wired communication unit 243 provided on the first body 210 are inserted into a port of the first wired communication unit 161 of the mobile terminal, wired communication, for example, USB I/O communication may be performed through the first and second wired communication units 161 and 243.

Accordingly, the mobile terminal 100 may supply an operating current and transmit a control signal or image signal to the second display unit 250 through a USB I/O interface. The second display unit 250 may also transmit a touch signal corresponding to a touch input applied thereto to the mobile terminal 100 through the USB I/O interface so as to process the touch signal.

On the other hand, the supply of the operating current and the transmission of the control signal or the image signal may be performed through different wired communication paths. To this end, the first and second wired communication units 161 and 243 may include a plurality of connector pins, and may be set to use different contact pins according to a type of signal to be transmitted.

Since the second wired communication unit 243 has a structure of being inserted into the first wired communication unit 161 to be coupled to the case, the plurality of contact pins molded on the second wired communication unit 234 are exposed to the outside. In the present disclosure, a structure including the plurality of contact pins, for example, 12 pins has been described as an example.

Although not shown, each of the first and second wired communication units 161 and 243 may include a waterproof member (not shown) molded together with the plurality of contact pins to prevent introduction of external fluid or an internal movement of fluid. In addition, the waterproof member may be replaced with an O-ring having an elastic force.

The second wired communication unit 243 provided on the first body 210 is configured to perform transmission and reception of wired data between the mobile terminal and the second display unit 250 through the wiring unit 242 included in the connection unit 230. The second wired communication unit 243 may also perform unidirectional communication with the first wired communication unit 161 (a data flow from the mobile terminal 100 to the second display unit 250) or bidirectional communication (a bidirectional data flow between the mobile terminal 100 and the second display unit 250).

The first and second wired communication units 161 and 243 according to the present disclosure may be a contact type connector. For example, the first and second wired communication units 161 and 243 may include a USB-C type connector type or a lightning cable type.

In addition, the first and second wired communication units 161 and 243 may be configured to transmit and receive various types of data in a wired communication manner. For example, such various types of data may be graphic data, audio data, video data, touch event data, control-related data, and a combination thereof.

In other words, the second display unit 250 provided on the second body 220 may be configured to operate based on power supplied from the power supply unit 191 of the mobile terminal 100.

In this case, as described above, the power may be transferred to the second display unit 250 provided on the second body 220 and the circuit board 244, through the connector 243 inserted into the connection port of the mobile terminal 100, the wiring unit 242 coupled to the first FPCB 247 and provided in the connection unit 230, and the second FPCB 248.

The power supply unit 191 of the mobile terminal 100 may supply an operating current (or power) to a power supply unit 291 of the second display unit 250, through an electric connection path of the first wired communication unit 243 inserted into the connection port, the first FPCB 247, the wiring unit 242 provided in the connection unit 230, and the second FPCB 248 provided in the second body 220. In this case, the operating current is supplied to the second display unit 250 through a specific contact pin provided in the first wired communication unit 243, for example, a 'CC1' pin of a USB C-type.

Meanwhile, the mobile terminal 100 may be detachably coupled to the first body 210. In addition, the mobile terminal may be configured to detect whether it is coupled with the first body 210. For the detection, the first body 210 may include a magnet 245 on one surface thereof which faces the mobile terminal 100, and the mobile terminal 100 may include a hall sensor 143 provided on a rear side thereof to sense a magnetic field corresponding to the magnet 245 when the terminal body is coupled to the first body. When the magnetic field is sensed by the hall sensor 143, the mobile terminal may recognize that it is coupled to the case and perform a preset control.

Here, the preset control does not necessarily mean the supply of the operating current as described above.

When the first and second wired communication units 161 and 234 are connected to communicate with each other, the mobile terminal 100 may recognize a plurality of resistors Ra and Rd formed in the first body 210, through a specific contact pin (e.g., CC1, CC2) of the plurality of contact pins included in the first wired communication unit 243 provided on the first body 210.

When the plurality of resistors is recognized as described above, power, for example, Vconn is supplied to the specific contact pin CC1, thereby supplying the operating current to the second display unit 250.

When the operating current is supplied to the second display unit 250, the system of the second display unit 250 is booted and initialized so as to operate in a standby state.

In some embodiments, the second display unit 250 may be in any one of an active state or an inactive state. Even when the second display unit 250 is in the inactive state, also referred to as the standby state, a second sensor (or touch panel) 252 provided in the second display unit 250 may be driven into an active state to sense a touch applied to the second display unit 250.

Meanwhile, when the second display unit 250 is activated, the controller of the mobile terminal 100 may transmit an image signal (video signal) corresponding to screen information, which is to be output to a display 251 provided in the second display unit 250, to the second wired communication unit 243 through the first wired communication unit 161. In this case, a wired communication path of the image signal is different from a wired communication path for the power supply described above.

For example, the power supply is performed along a wired communication path via the CC1 pin provided in the second wired communication unit 243. On the other hand, the image signal may be transferred to the second display unit 250 along a wired communication path via USB SS1 and SS2 pins.

The second display unit 250 may receive data from the first wired communication unit 161 through the second wired communication unit 243 and the circuit board 244. In this case, a digital image signal may be converted into data in a format, which can be output to the second display unit 250, through a data conversion unit 282. For example, the second display unit 250 may be configured as an LCD panel. At this time, a digital image signal in a DP format received from the mobile terminal 100 may be converted into a data format (e.g., MIPI format), which can be received by the LCD panel, by the data conversion unit 282, and then transferred and output to the display 251.

Meanwhile, data transmitted and received through the first and second wired communication units 161 and 243 may be transmitted and received using different contact pins in the USB I/O interface depending on a type of data.

Specifically, for example, an image signal may be transmitted and received between the mobile terminal 100 and the second display unit 250 through a USB SSPHY pin, and converted into a format (e.g., MIPI format) through the data conversion unit 282 so as to be output to the second display unit 250. For example, a control signal related to the operation of the second display unit 250 may be transmitted to the second display unit 250 through an EDP (External Display Port) AUX pin.

Signals, such as a communication control signal, a touch signal, a brightness control signal and the like, which are needed to be transmitted and received between the mobile terminal 100 and the second display unit 250 may be transmitted and received through first and second signal processing units 181 and 281 using a second USB Human Interface Device (HID) communication.

At this time, in an initial state of the mobile terminal 100, the first signal processing unit 181 transmits and receives signals through a first USB communication using A-side pins A6 and A7 and B-side pins B6 and B7 of the connector. Meanwhile, when the plurality of resistors Ra and Rd is recognized through the CC1 pin as the first and second wired communication units 161 and 234 are connected to communicate with each other, the state of the mobile terminal is changed from the initial state and the first signal processing unit 181 is turned on by a switch and transmits and receives signals through a second USB communication using only the B-side pins B6 and B7.

As described above, when the switch is turned on to perform signal processing using the second USB communication, the first and second signal processing units 181 and 281 perform I²C (Inter-integrated Circuit, or I2C) conversion by the USB HID communication, to perform an operation corresponding to a touch applied to the second display unit 250, for example, transmission of a touch signal corresponding to the touch, or the like. In addition, the first and second signal processing units 181 and 281 may support Hot Plug Detect (HPD) communication between a controller 280 and the data conversion unit 282 through the second USB communication.

The initialization of the second display unit 250 or the like may be controlled by the controller 280 included in the second display unit 250.

As described above, the mobile terminal according to the present disclosure may control information output to the second display unit 250 provided on the case 200. That is, the operation of the second display unit 250 may be controlled by the mobile terminal 100. To this end, the connection port of the mobile terminal and the connector provided on the case 200 may be connected and the plurality of resistors may be recognized, thereby indicating connection to the case 200. Therefore, in the present disclosure, since it is not necessary to employ a separate chip for communication between the mobile terminal and the case 200, compatibility even with various models of mobile terminals can be realized, the cost can be saved, and the case 200 can be made thinner.

Hereinafter, the control method between the mobile terminal and the display unit provided in the case will be described in more detail based on the aforementioned configuration, with reference to the accompanying drawings.

Figure 5:
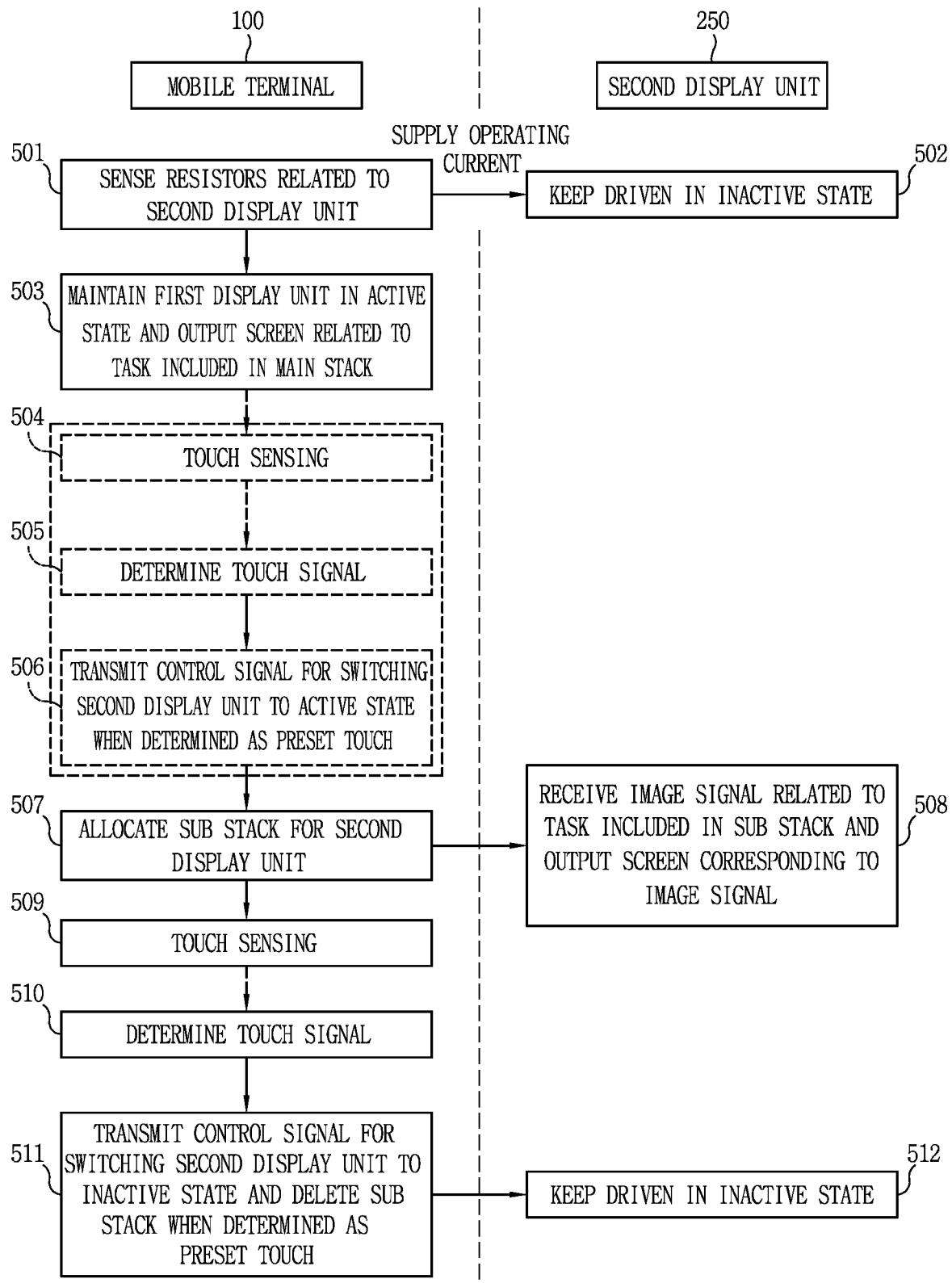
FIG. 5 is a flowchart illustrating a signal flow for performing activation or deactivation of a display unit provided on a case based on a touch input, and a change of a sub stack, in an electronic device according to the present disclosure.

FIG. 5 is a representative flowchart illustrating a signal flow and stack allocation method in relation to a control between a mobile terminal and a display unit provided in a case, in an electronic device according to the present disclosure.

First, in the electronic device 300 according to the present disclosure, when the mobile terminal 100 is coupled to the case 200, the mobile terminal 100 may sense resistors corresponding to the second display unit 250 through connection between the connection port and the connector (501).

Specifically, when the connection port of the mobile terminal 100 is connected to the connector provided on one side of the case 200, the mobile terminal 100 may recognize a plurality of resistors provided together with the connector, to supply an operating current to the second display unit 250.

When the plurality of resistors is recognized, the operating current may be supplied from the mobile terminal 100 to the second display unit 250 through the connector, and the second display unit 250 may maintain an inactive state (502).

Specifically, when the plurality of resistors is recognized, the power supply unit 191 of the mobile terminal 100 operates in a host mode to supply the operating current downstream to the connector. In other words, the connection port of the mobile terminal 100 is switched to operate as a Downstream Facing Port (DFP), so that the operating current is supplied to the contact pin of the connector. For example, the operating current is supplied in the form of Vconn power through the CC1 pin of the contact pins of the connector.

In this case, the second display unit 250 operates in a device mode to receive the operating current upstream. That is, the connector provided on the case 200 is operated as an upstream facing port (UFP).

As described above, the operating current supplied through the CC1 pin of the connector provided on the case 200 is supplied to the second display unit 250, the circuit board 244, and the like through the wiring unit 242 coupled with the first and second FPCBs 247 and 248. The operating current is also supplied to the power supply unit 291 of the second display unit 250.

Meanwhile, as described above, the electronic device 300 may be in any one of the open state and the closed state. When it is detected that the electronic device 300 is switched from the open state to the closed state, the first display unit 151 provided on the mobile terminal is kept driven in an active state and a screen associated with a task included in a main stack is output to the first display unit 151 (503).

Here, the main stack means a memory stack allocated for the first display unit 151.

In some embodiments, the detection of switching from the closed state to the open state may be performed, for example, by recognizing a sensing value of an illumination sensor provided on the front surface of the mobile terminal 100.

Thereafter, when a preset touch input is applied to the first display unit 151 in the active state, the touch is sensed through the touch sensor provided on the first display unit 151 (504). And a touch signal corresponding to the detected touch is determined (505).

As a result of the determination, when the touch signal is for switching the second display unit 250 to an active state, the controller of the mobile terminal outputs a control signal for switching the second display unit 250 to the active state and transmits the control signal to the second display unit 250 (506).

As another example, when the first display unit 151 of the mobile terminal is activated as it is detected that the electronic device 300 is switched from the closed state to the open state, the second display unit 250 may be switched from an inactive state to an active state for operation after the elapse of a predetermined time (for example, 0.5 to 1 second). That is, after the screen of the first display unit 151 is turned on, the screen of the second display unit 250 may be turned on after the predetermined time.

In some embodiments, preceding steps 504 to 506 described above may be omitted. That is, the operation of activating the second display unit 250 based on the touch applied to the first display unit 151 may not necessarily be performed.

In this case, before the step 503 of activating the first display unit 151, a step of detecting whether the electronic device 300 has been switched from the closed state to the open state may further be performed.

Meanwhile, as another example, although not shown, when a preset touch input is applied to the second display unit 250 while the second display unit 250 is driven in an inactive state, a control signal for switching the second display unit 250 to an active state may also be transmitted from the mobile terminal 100 to the second display unit 250.

In this case, the signal processing corresponding to the touch signal may be performed by the first and second signal processing units 181 and 281 as described above.

In detail, the mobile terminal 100 performs wired communication using the first USB communication in the initial state. When the plurality of resistors Ra and Rd corresponding to the second display unit 250 is recognized (e.g., when a touch signal is transmitted from the second display unit 250), the mobile terminal 100 then controls an operation corresponding to the touch by using the second USB communication connected by B-side contact pins (e.g., B6, B7) of the connector 243.

Even when the second display unit 250 is in the inactive state, a touch sensor (or touch panel) 252 provided in the second display unit 250 may sense a touch applied to the second display unit 250.

The sensed touch may be subjected to I2C conversion through the first and second signal processing units 181 and 281. In addition, the sensed touch is transferred from the second display unit 250 to the mobile terminal 100 through the circuit board 244 provided in the second body 220 of the case, the wiring unit 242 coupled to the first and second FPCBs 247 and 248, and the connector, namely, the second wired communication unit 243.

Then, the mobile terminal 100 determines whether or not the touch signal transmitted from the second display unit 250 corresponds to a preset touch input. Here, the preset touch input may refer to, for example, a plurality of successive inputs or taps applied to the second display unit 250 so that the second display unit 250 in an inactive state may be switched to an active state.

If the touch signal is determined as the preset touch input, the mobile terminal 100 may perform the step 506. That is, the controller of the mobile terminal 100 may output a control signal for switching the second display unit 250 to an active state, and transmit the control signal to the second display unit 250.

When the second display unit 250 is activated as described above, a sub stack for the second display unit 250 is allocated (507).

Here, a stack refers to a data structure for storing data and retrieving data, for example by push and pop methods. In some embodiments a stack or a queue may be implemented. The stack type is a first-in last-out data structure, and the queue type is a first-in first-out data structure. For simplicity, implementations using stacks will be discussed, however it will be understood by those of ordinary skill in the art, that other data structures, such as queues, may also be implemented in alternate embodiments.

The stack type is limited to inserting and deleting data at only one end. In the present disclosure, stacks for the first and second display units 151 and 250 are separately allocated and removed according to activation or deactivation. In the present disclosure, a task related to displayed screen information is included/stacked on the allocated stack.

Here, the task may be a modularized unit related to the execution of a specific application. In addition, various operations within the specific application may exist in an activity unit within the task.

Thus, the stack is not allocated separately for each application, but a plurality of tasks or activities related to a plurality of applications are stacked (included) in one stack.

Next, an image signal related to a task included in the sub stack is transmitted from the mobile terminal 100 to the second display unit 250. Here, the task may refer to a unit of outputting, executing or managing data popped from the sub stack.

Thus, for example, when a home screen page is displayed on a display unit, it can be said that a stack or sub stack allocated for this includes/stacks a task for the home screen page.

The first and second wired communication units 161 and 243, for example, transmit an image signal, which is related to a task to be included in the sub stack, as a DP-type image signal through a USB SS PHY pin of the connected connector.

In detail, the DP-type image signal is transmitted along the first and second wired communication units 161 and 243 connected to each other and the wiring unit 242 coupled with the first and second FPCBs 247 and 248, is converted into an MIPI format through the data conversion unit 282 of the second display unit 250, and then transferred to the second display unit 250.

Next, the second display unit 250 receives the image signal (the image signal converted into the MIPI format) related to the task popped from the sub stack and outputs a screen corresponding to the received image signal (508).

As described above, when a preset touch is detected on the first display unit 151 while the second display unit 250 is activated (509), a touch signal corresponding to the touch is determined (510). Here, the preset touch is a touch input for converting the second display unit 250 from the active state into an inactive state, for example, may refer to a touch input applied to a specific icon displayed on the first display unit 151.

When it is determined as a preset touch, the controller of the mobile terminal outputs a control signal for switching the second display unit 250 into the inactive state, transmits the control signal to the second display unit 250 through USB communication, and deletes or otherwise removes the sub stack for the second display unit 250 (511).

Meanwhile, the second display unit 250 receives the control signal through the first and second wired communication units 161 and 243, and accordingly is switched from the active state into the inactive state. In response to the second display unit 250 being switched into the inactive state, the mobile terminal may delete or otherwise remove the sub stack for the second display unit 250.

Thereafter, the second display unit 250 is maintained in the inactive state (512).

Hereinafter, the flow of the operations according to the present disclosure described above will be described in detail, in association with the allocation of the memory stacks, with reference to FIGS. 6A to 6D.

Figure 6A:
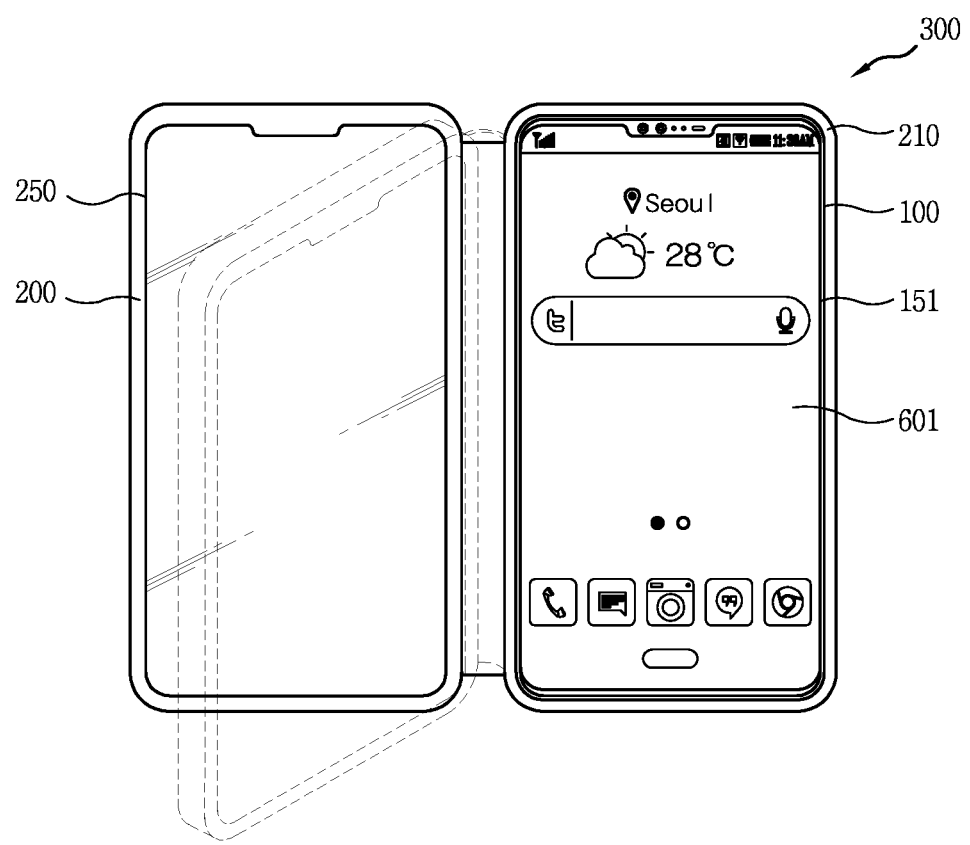
FIGS. 6A to 6D are flowcharts illustrating each process in the flowchart of FIG. 5 in detail.

First, FIG. 6A illustrates a case where the connection port of the mobile terminal is connected to the connector of the case in the electronic device 300 according to the present disclosure, and the first display unit 151 is maintained in the active state and the second display unit 250 of the case 200 is in the inactive state while the electronic device 300 is in the open state.

When the connection port of the mobile terminal is connected to the connector of the case and the plurality of resistors corresponding to the second display unit 250 is sensed, an operating current is supplied to the second display unit 250 and the circuit board 244 of the case through the first and second wired communication units 161 and 243 and the wiring unit 242.

First screen information may be displayed on the first display unit 151 which is in the active state. Here, the first screen information is not limited to any specific type. For example, the first screen information may be a first home screen page 601 as illustrated in FIG. 6A. In another example, the first screen information may be changed variously, for example, to an execution screen of a specific application, a web page, a setting screen, or the like, depending on settings or user selection.

Figure 6B:
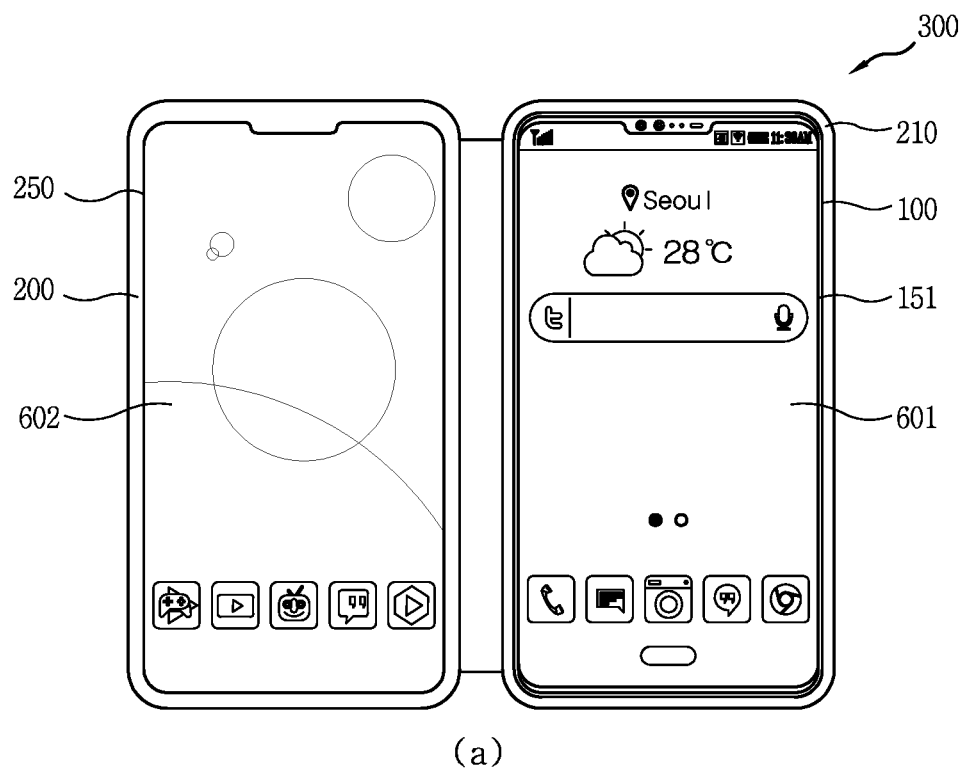
Figure 6B:
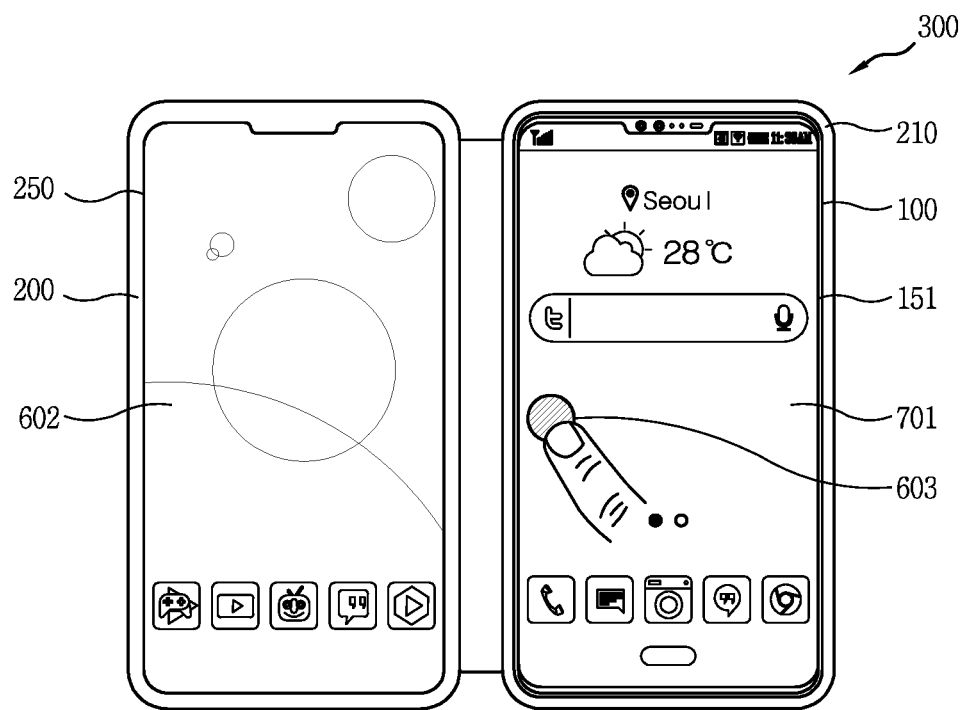
Figure 6C:
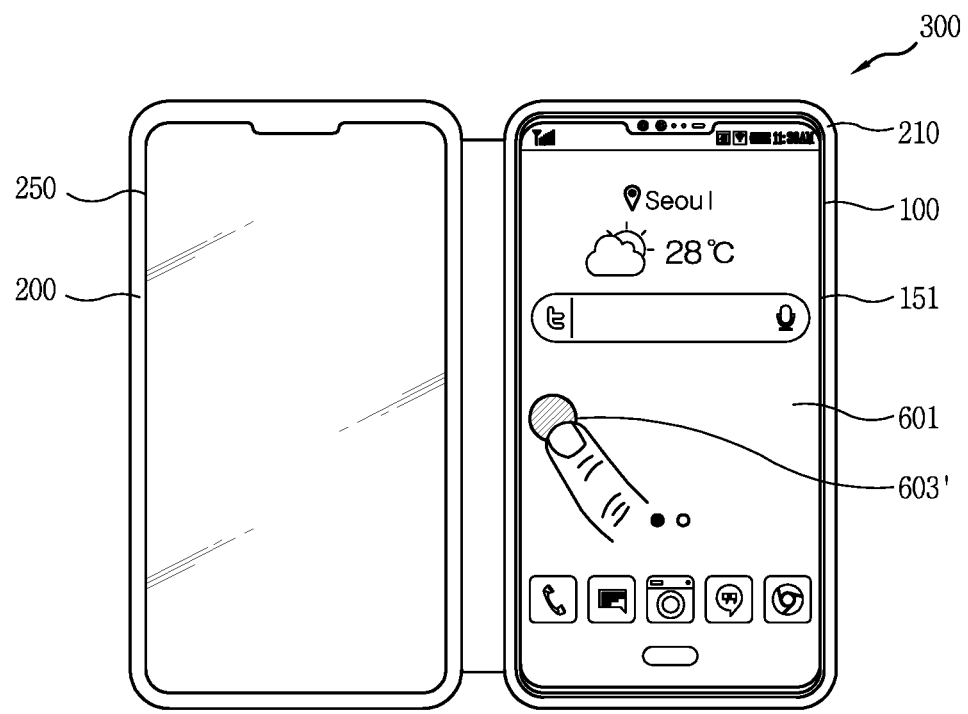
Figure 6D:
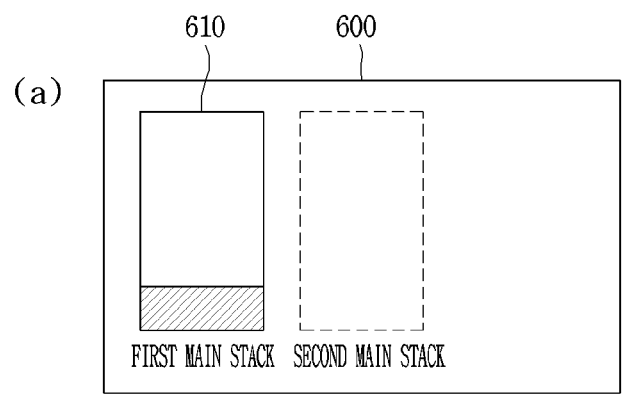
Figure 6D:
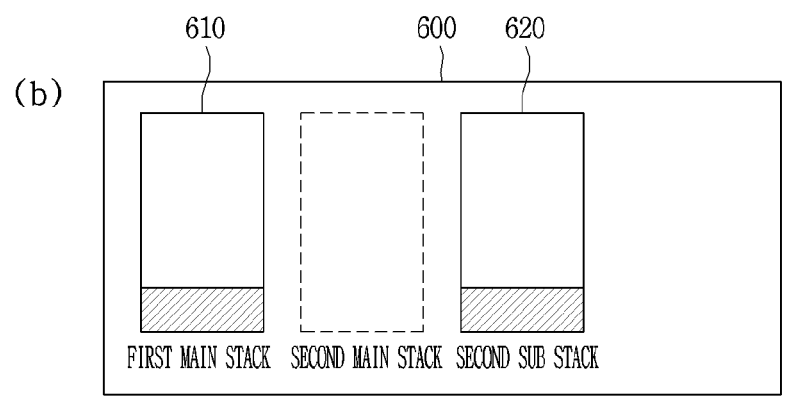
Figure 6D:
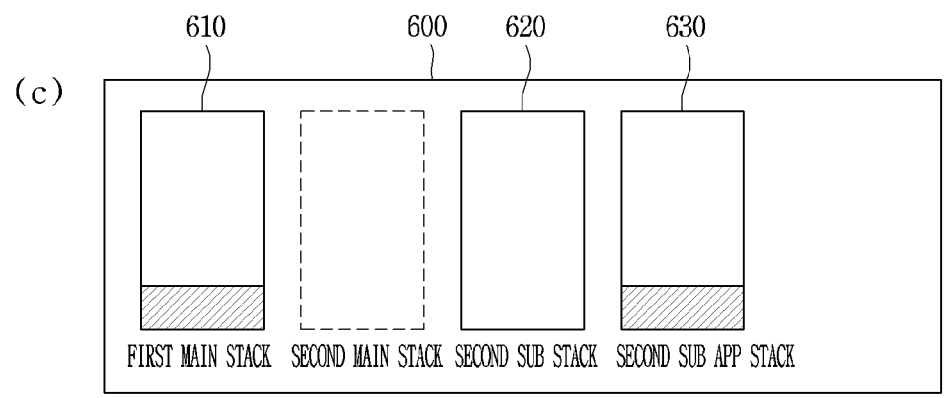

As such, in relation to the first home screen page 601 displayed on the first display unit 151 which is in the active state, as shown in (a) of FIG. 6D, a main home stack 610 for the first display unit 151 may be allocated on the memory 600 of the mobile terminal 100. (See FIG. 6D). And, a task related to the displaying of the first home screen page 601 may be stacked on the allocated main home stack 610.

In some embodiments, stacks for the first and second display units 151 and 250 are separately allocated and removed according to activation or deactivation of the first and second display units 151 and 250.

In the open state, the second display unit 250 may be switched to an active state (a) when a predetermined time elapses after the first display unit 151 is activated or (b) when a preset touch input is applied to the first display unit 151, for example, a touch input is applied to a specific icon. See FIG. 6B. Alternatively, although not shown, even when a touch input is applied to the second display unit 250, the second display unit 250 may be switched to the active state.

First, referring to (a) of FIG. 6B, while the operating current is supplied to the second display unit 250 in response to sensing the resistors related to the second display unit 250, when it is detected that the electronic device 300 is switched from the closed state to the open state and the first display unit 151 is activated, a control signal for switching the second display unit 250 into the active state may be transferred to the second display unit 250. In this case, the control signal is generated by the mobile terminal 100 and transferred to the circuit board 244 coupled to the second display unit 250 through the first and second wired communication units 161 and 243 and the wiring unit 242.

An image signal corresponding to a screen to be output to the second display unit 250 is also simultaneously or sequentially transferred to the circuit board 244 coupled to the second display unit 250 through the first and second wired communication units 161 and 243 and the wiring unit 242. In this case, the image signal is transmitted in a DP format, converted into an MIPI format to be output to the second display unit 250 through the data conversion unit 282, and then provided to the second display unit 250.

Meanwhile, a condition of the open state for switching the first display unit 151 into an active state and a condition of the open state for switching the second display unit 250 into an active state may be different from each other. For example, the threshold for determining an open state for switching (driving, operating) the second display unit 250 into the active state may be higher or lower than switching the first display unit 151 to the active state.

As an example, for activating the second display unit 250, the open state may be determined in response to opening the device such that a first angle is formed between the first display unit and the second display unit, wherein as for activating the first display unit 151, the open state may be determined in response to opening the device such that a second angle is formed between the first display unit and the second display unit, where the first angle is greater than the second angle. In this example, the first and second threshold angles may be predefined or set by a user.

In addition, the setting of whether to switch the second display unit 250 into the active state just after the first display unit 151 is switched into the active state may be turned on/off depending on a user input.

Next, referring to (b) of FIG. 6B, while the operating current is supplied to the second display unit 250, when a preset touch input (e.g., a touch input applied to a predetermined icon 603 or a multi-finger touch gesture) is applied to the first display unit 151, a control signal to perform an operation corresponding to the touch input, namely, switching into the active state may be transmitted to the mobile terminal 100 through USB HID communication.

In this case, since the control signal is a touch-related signal, the control signal is transmitted to the mobile terminal 100 through the first and second signal processing units 181 and 281 using the USB HID communication.

Meanwhile, referring to FIG. 6C, while the second display unit 250 is in the active state, when the preset touch input (e.g., the touch input applied to the predetermined icon 603 or the multi-finger touch gesture) is applied to the first display unit 151 again, the second display unit 250 is switched to the inactive state.

To this end, a control signal corresponding to a touch signal of the preset touch input, namely, a control signal for switching the second display unit 250 to the inactive state is transferred from the mobile terminal to the second display unit 250 through USB communication. Accordingly, the second display unit 250 is switched back into the inactive state and the transmission of the image signal from the mobile terminal is stopped.

Meanwhile, as another example, while the operating current is supplied to the second display unit 250, when a preset touch input (e.g., a double tap) is applied to the second display unit, a touch signal corresponding to the preset touch input is transmitted to the mobile terminal 100 through the circuit board 244 connected to the touch panel, the wiring unit 242 coupled to the first and second FPCBs 247 and 248, and the first and second signal processing units 181 and 281 using the USB HID communication.

The controller 180 of the mobile terminal 100 then transmits a control signal for activating the second display unit 250, based on the transmitted touch signal, to the second display unit 250 and the circuit board coupled to the second display unit 250 through the connector connected to the connection port of the mobile terminal. In this case, since the control signal is a touch-related signal, the control signal is transmitted to the mobile terminal 100 through the first and second signal processing units 181 and 281 using the USB HID communication.

In this case, the touch-related signal is initially transmitted to the mobile terminal 100 through USB 2.0 communication (hereinafter, referred to as 'first USB communication'), while being transmitted through USB HID communication (hereinafter, referred to as 'second USB communication') switched from the USB 2.0 communication when the mobile terminal 100 operates in a host mode (i.e., when the resistors Ra and Rd are sensed).

In addition, the control signal is transmitted in an AUX format to the second display unit 250 through the first and second wired communication units 161 and 243 and the wiring unit 242. The AUX-type control signal is transmitted to the second display unit 250 via the data conversion unit 282.

As such, when the second display unit 250 is switched to the active state, second screen information, for example, a second home screen page 702 may be displayed on the second display unit 250.

To this end, an image signal corresponding to the second home screen page to be output to the second display unit 250 is transferred to the circuit board 244 coupled to the second display unit 250 through the first and second wired communication units 161 and 243 and the wiring unit 242. In this case, the image signal is transmitted in a DP format, converted into an MIPI format to be output to the second display unit 250 through the data conversion unit 282, and then provided to the second display unit 250.

On the other hand, a control signal for switching the second display unit 250 to an active state and an image signal corresponding to a screen to be output to the second display unit 250 are transmitted through different contact pins in the first and second wired communication units 161 and 243.

As such, in relation to displaying the first home screen page 601 on the activated first display unit 151, referring to (b) of FIG. 6D, a second sub stack 620 for the second display unit 250 in addition to the first main stack 610 for the first display unit 151 is allocated on the memory 600.

In this case, the second sub stack 620 includes a task related to a DP-type image signal transferred to the circuit board 244 coupled to the second display unit 250 through the first and second wired communication units 161 and 243 and the wiring unit 242.

The first main stack 610 and the second sub stack 620 are independently controlled. When a task corresponding to a specific application is executed on the second display unit 250, a second sub App stack 630 is further allocated to the second sub stack 620, as illustrated in (c) of FIG. 6D, so that the task corresponding to the specific application is stacked.

The controller 180 of the mobile terminal may transmit the DP-type image signal corresponding to the task stacked on the second sub App stack 630 to the circuit board 244 coupled to the second display unit 250 through the first and second wired communication units 161 and 243 and the wiring unit 242.

In this case, the image signal transmitted in the DP format is converted into the MIPI format through the data conversion unit 282 to be output to the second display unit 250, and then transferred to the second display unit 250. Accordingly, screen information corresponding to the task stacked on the second sub App stack 630 is displayed on the second display unit 250.

As such, the electronic device 300 according to the present disclosure transmits a control signal transmitted to the circuit board connected to the second display unit 250 and an image signal corresponding to screen information to be displayed on the second display unit 250, through different contact pins of the connector.

Meanwhile, as illustrated in FIG. 6C, when the second display unit 250 is deactivated, the sub stacks (e.g., the sub home stack and the sub App stack) allocated on the memory are deleted from the memory.

On the other hand, although not shown, in the active state of the second display unit 250, when the connection port of the mobile terminal and the connector of the case are disconnected so that the wired communication path of the first and second wired communication units 161 and 243 is released, the supply of the operating current is stopped and the second display unit 250 is switched to the inactive state.

At this time, when the connection port of the mobile terminal and the connector of the case are connected again, the second display unit 250 is switched back into the active state, and screen information which has been displayed on the second display unit 250 before the connection is released is output again.

Hereinafter, description will be given of an exemplary screen control for executing different applications in the mobile terminal 100 and the second display unit 250 and a multi-stack structure according to the screen control, with reference to FIGS. 7A to 7C and 8A to 8C.

Figure 7A:
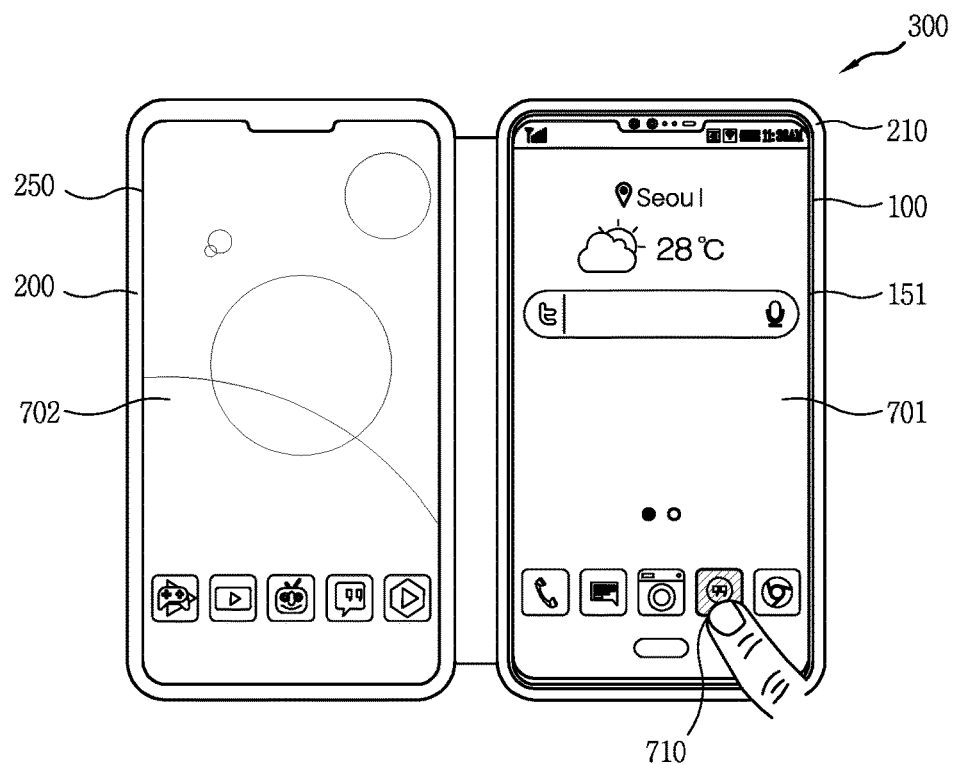
FIGS. 7A, 7B, and 7C, 8A, 8B, and 8C, 9A and 9B, 10A and 10B, 11A, 11B, 11C, and 11D, 12A, 12B, and 12C, 13A, 13B, and 13C, 14A, 14B, and 14C, and 15A, 15B, and 15C, 16A, 16B, and 16C, 17A and 17B, 18A, 18B, 18C, and 18D, and 19A and 19B are various exemplary views related to screen control between a display unit provided on a mobile terminal and a display unit provided on a case.

First, referring to FIG. 7A, when both the first and second display units 151 and 250 are activated, a first home screen page 701 may be displayed on the first display unit 151, and a second home screen page 702 different from the first home screen page 701 may be displayed on the second display unit 250.

Figure 8A:
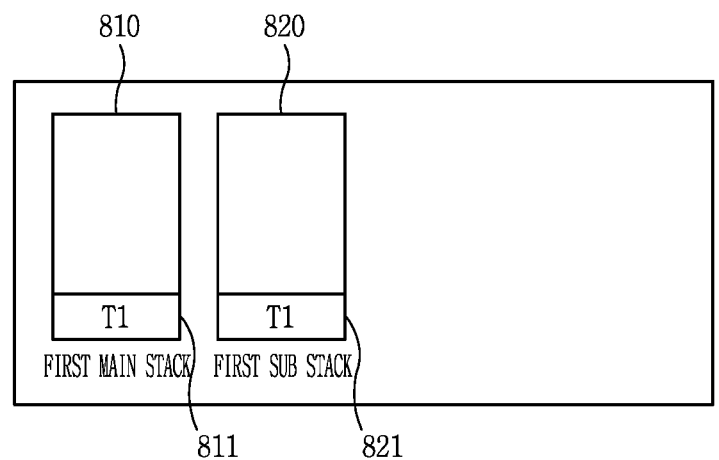

In this case, as illustrated in FIG. 8A, a first main stack 810 for the first display unit 151 and a first sub stack 820 for the second display unit 250 are generated, respectively, in the memory of the mobile terminal 100.

A task 811 related to the first home screen page 701 is pushed on to the first main stack 810, and a task 821 related to the second home screen page 702 is pushed onto the first sub stack 820.

Figure 7B:
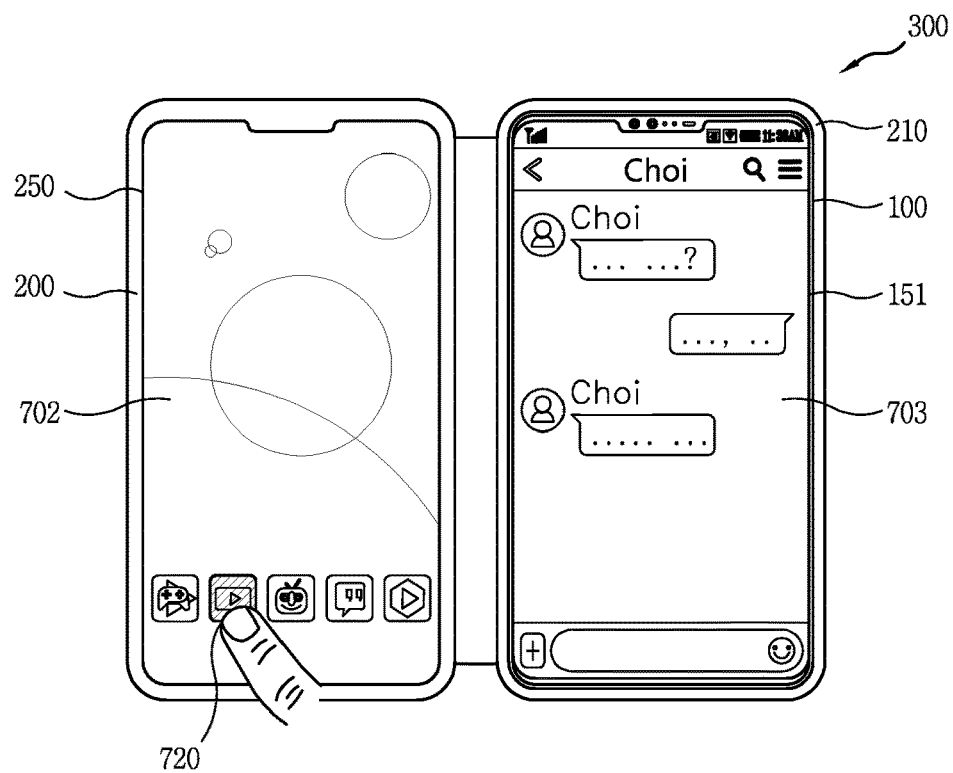

Referring back to FIG. 7A, in a state where the first and second home screen pages 701 and 702 are displayed as described above, when a touch input is applied to an icon (or widget, etc.) 710 of a specific application included in the first home screen page 701 displayed on the first display unit 151, as illustrated in FIG. 7B, first screen information 703 corresponding to the execution of the corresponding application is displayed on the first display unit 151.

Here, a message chat screen is exemplarily illustrated as the first screen information, but the first screen information is not limited to any specific type if it can be accessed through a home screen page.

Meanwhile, while the first main stack 810 for the first home screen page 701 is maintained, when a first application is executed using the first home screen page 701, the controller of the mobile terminal 100 may generate a second main stack 830 (see FIG. 8B) and a task related to the first screen information 703 of the first application is pushed onto the generated second main stack 830.

Figure 8B:
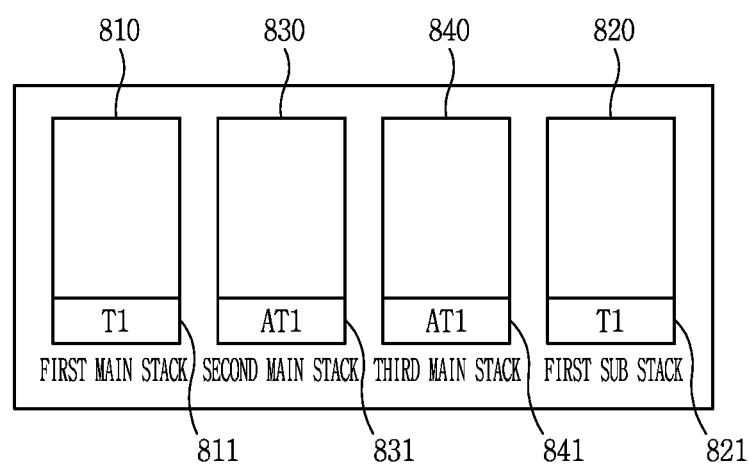

In addition, as an example, as illustrated in FIG. 8B, in addition to the second main stack 830, a third main stack 840 may be additionally generated for separately managing a currently-executed application. Here, the third main stack may be defined as a stack for processing and managing a task being executed on the first display unit 151 on the application basis.

In addition, the third main stack 840 may be generated or deleted together with the second main stack 830. However, tasks included in the second main stack 830 and the third main stack 840 may be different from each other.

Figure 7C:
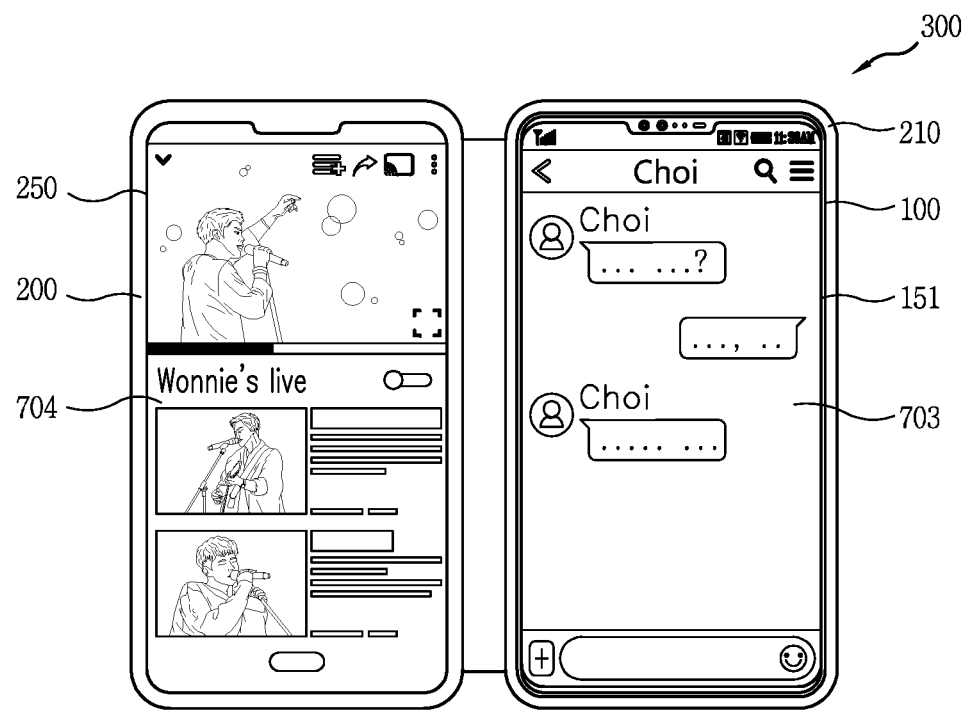

Referring back to FIG. 7B, when a touch input is applied to an icon (or a widget, etc.) 720 of a specific application, which is included in the second home screen page 702 displayed on the second display unit 250, as illustrated in FIG. 7C, second screen information 704 corresponding to the execution of the corresponding specific application is displayed on the second display unit 250.

Here, a video screen is exemplarily illustrated as the second screen information, but the second screen information is not limited to any specific type if it can be accessed through a home screen page.

Meanwhile, while the first sub stack 820 for the second home screen page 702 displayed on the second display unit 250 is maintained, when a second application is executed using the second home screen page, the controller of the mobile terminal may generate a second sub stack 850 (see FIG. 8C) and a task 851 related to the second screen information 704 of the second application is pushed onto the generated second sub stack 850.

Figure 8C:
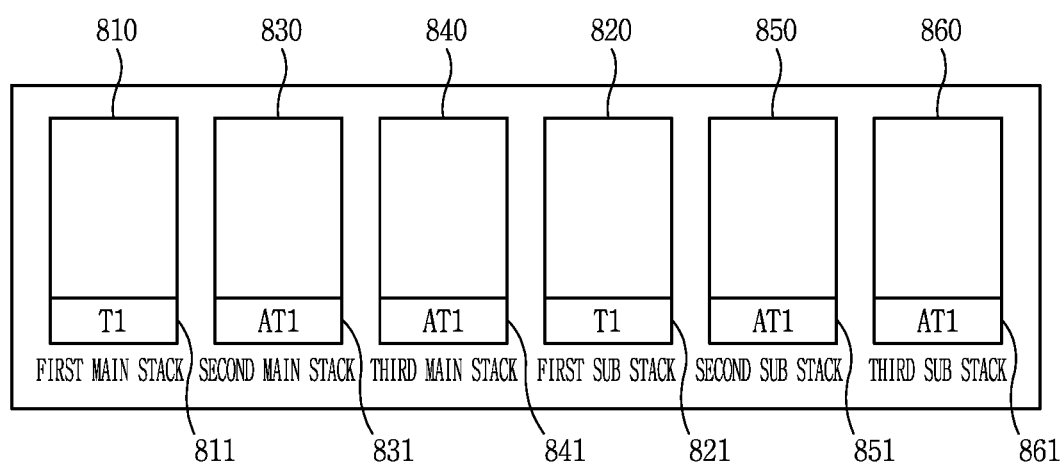

In addition, as an example, as illustrated in FIG. 8C, in addition to the second sub stack 850, a third sub stack 860 may be additionally generated for separately managing a currently-executed application. Here, the third sub stack may be defined as a stack for processing and managing a task being executed on the second display unit 250 on the application basis.

The third sub stack 860 may also be generated or deleted together with the second sub stack 850. However, tasks included in the second sub stack 850 and the third sub stack 860 may be different from each other.

Now, the first screen information corresponding to the task inserted into the second main stack 830 is displayed on the first display unit 151, and the second screen information corresponding to the task inserted into the second sub stack 850 is displayed on the second display unit 250, corresponding to FIGS. 7C and 8C.

To this end, the controller 180 of the mobile terminal transmits an image signal corresponding to the second screen information to the second display unit 250 through the first and second wired communication units 161 and 243 and the wiring unit 242. The second display unit 250 converts the image signal received in the DP format into an image signal in the MIPI format through the data conversion unit 282, and then displays second screen information corresponding to the image signal.

Meanwhile, the structure of the third main stack 840 is associated with the structure of the second main stack 830, and the structure of the third sub stack 860 is associated with the structure of the second sub stack 850. However, the generation or deletion of the second and third main stacks 830 and 840 does not affect the generation or deletion of the second and third sub stacks 850 and 860, and each is managed separately.

In addition, when only an execution depth of a specific application is changed after execution of the specific application, only the task included in the second main stack 830 or the second sub stack 850 may be changed, and tasks included in recently-executed App stacks, third main stack 840 and third sub stack 860 may be maintained without change.

When the supply of operating current is cut off in the mobile terminal or when the electronic device 300 is switched from the open state to the closed state, the first to third sub stacks 820, 850, and 860 may be deleted or otherwise removed.

Hereinafter, description will be given of an operation for displaying one expanded image over the mobile terminal 100 and the second display unit 250 and a multi-stack structure according to the operation, with reference to FIGS. 9A and 9B and FIGS. 10A and 10B.

Figure 9A:
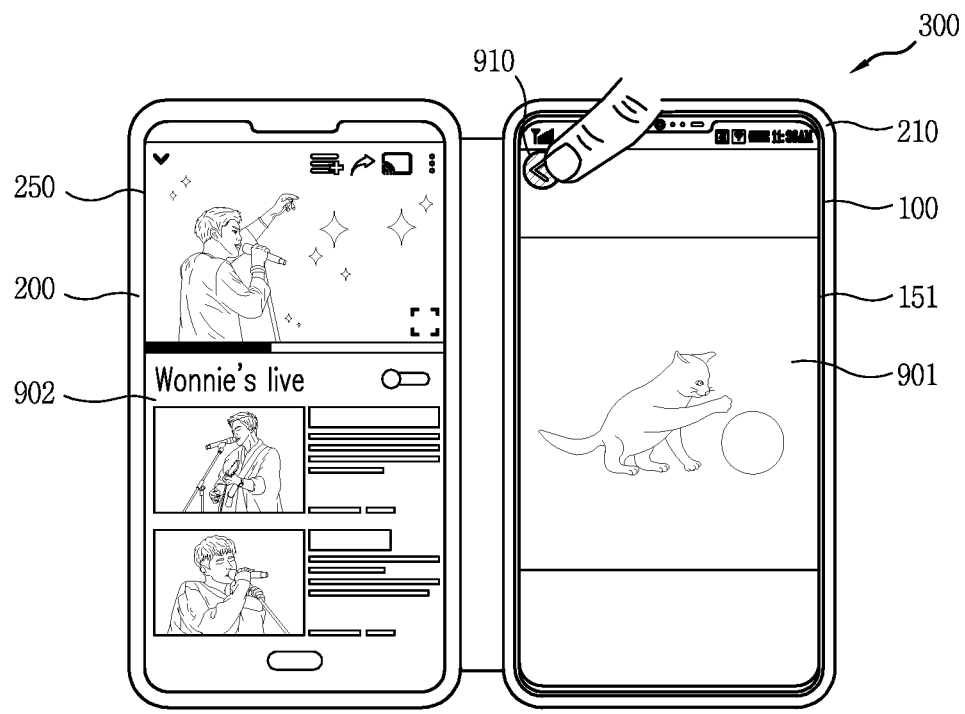

First, referring to FIG. 9A, while both the first and second display units 151 and 250 of the electronic device 300 are activated, a specific image 901 which is displayed as first screen information on the first display unit 151 or an execution screen (e.g., a video playback screen) of a specific application which is displayed as second screen information on the second display unit 250 may be controlled to be displayed in an expanded manner fully over the first and second display units 151 and 250 as one full screen.

To this end, the controller of the mobile terminal may detect reception of an input for expanding the size of the first screen information displayed on the first display unit 151. For example, the controller of the mobile terminal may detect a touch input applied to an execution icon 910 for size expansion, disposed on one area of the first display unit 151.

Figure 10A:
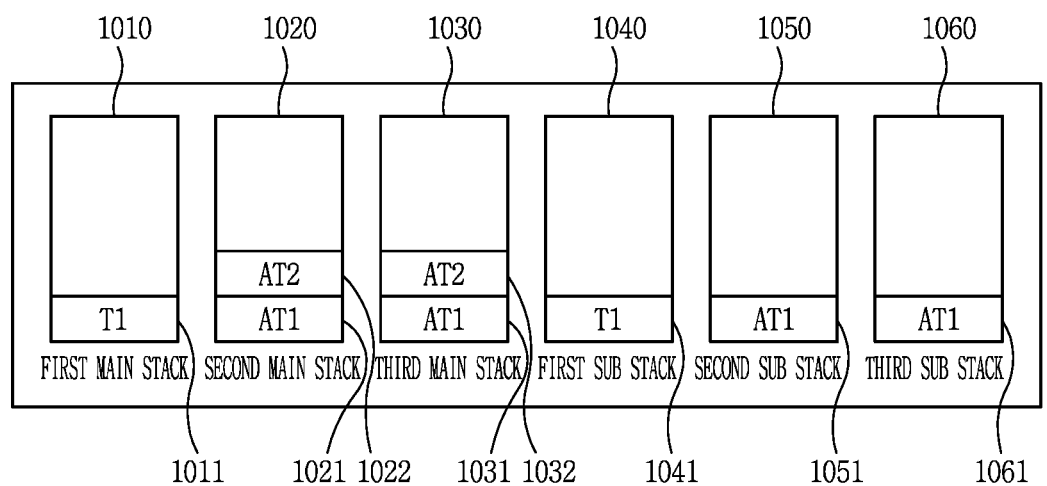
Figure 10B:
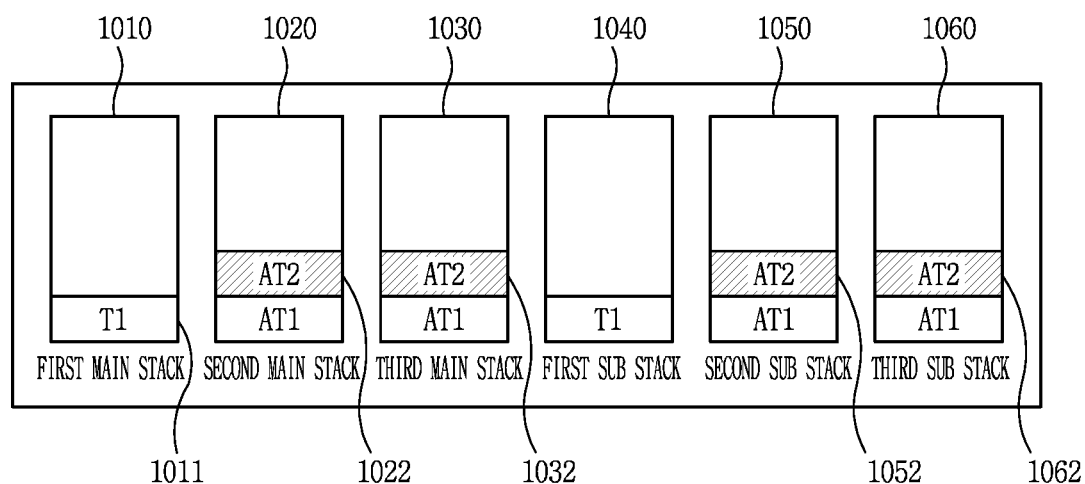

Accordingly, the controller of the mobile terminal may control the memory 170 such that a task 1021 corresponding to the first screen information included in a second main stack 1020 (see FIG. 10A) is pushed onto a second sub stack 1050. Accordingly, as illustrated in FIG. 10B, tasks 1022 and 1032 related to the specific image 901, included in second and third main stacks 1020 and 1030, are also included in second and third sub stacks 1050 and 1060. Therefore, the same tasks 1052 and 1062 as the tasks 1022 and 1032 are included at the top of the second and third sub stacks 1050 and 1060.

In addition, the controller of the mobile terminal may expand the size of the first screen information, namely, the specific image 901 displayed on the first display unit 151, display a first part 901a of the expanded first screen information on the first display unit 151, and transmit an image signal corresponding to the remaining second part 901b of the expanded first screen information to the second display unit 250 through the first and second wired communication units 161 and 243 and the wiring unit 242, so that the second part 901b of the expanded first screen information is displayed on the second display unit 250.

Figure 9B:

Meanwhile, as illustrated in FIG. 9B, when one expanded image 901a and 901b is displayed over the first and second display units 151 and 250, an execution icon 920 for restoring the expanded image to the original size may be generated on the second display unit 250 (or the first display unit 151).

When a touch input is applied to the execution icon 920, the controller of the mobile terminal reduces the size of the expanded first screen information and displays the first screen information in its original size only on the first display unit 151. Alternatively, while not depicted, it will be understood that in other embodiments, second screen information originally displayed on the second display unit 250 may be similarly expanded to be displayed across the first display unit 151 and the second display unit 250, and a touch input to the execution icon 920 would reduce the size of the expanded second screen information and display the second screen information in its original size only on the second display unit 250. Similar disclosure regarding handling of the main stacks and sub stacks will be understood with respect to the above other embodiments regarding expanding the second screen information.

In addition, the controller of the mobile terminal deletes the tasks 1052 and 1062 corresponding to the first screen information from the second and third sub stacks 1050 and 1060 and, accordingly, transmits an image signal corresponding to the previously-displayed second screen information to the second display unit 250 through the first and second wired communication units 161 and 243 and the wiring unit 242.

Hereinafter, an exemplary operation for sending a screen from one of the mobile terminal 100 and the second display unit 250 to another and a multi-stack structure for the operation will be described, with reference to FIGS. 11A to 11D and 12A to 12C.

First, an operation of transmitting first screen information 1101, for example, a message chat (conversation) screen displayed on the first display unit 151 to the second display unit 250 will be described, with reference to FIGS. 11A, 11B, 12A and 12B.

Figure 11A:
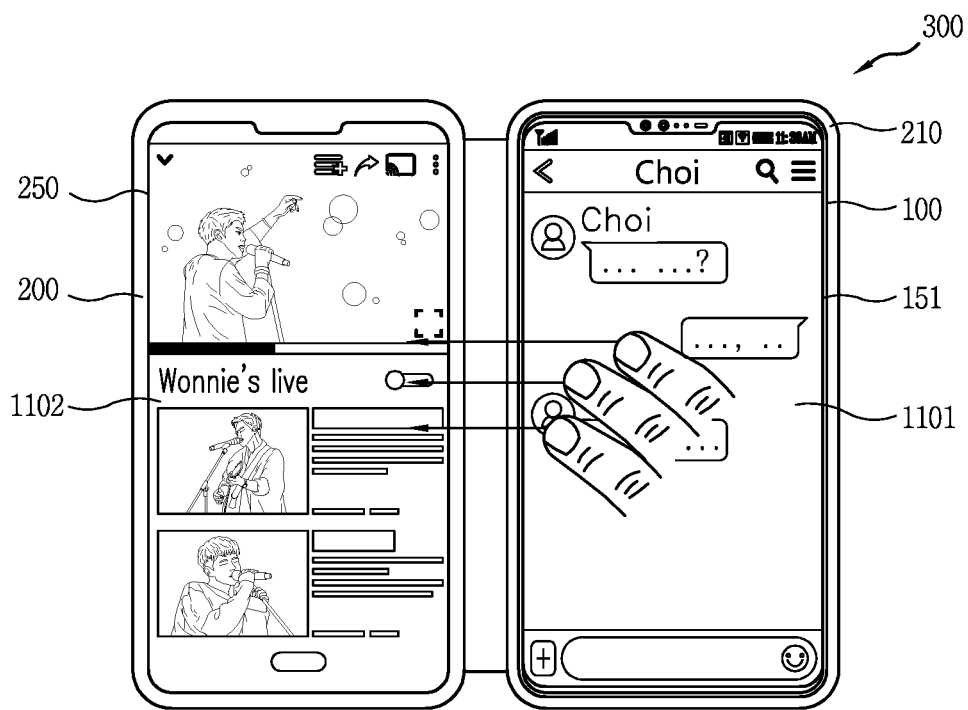
Figure 11B:
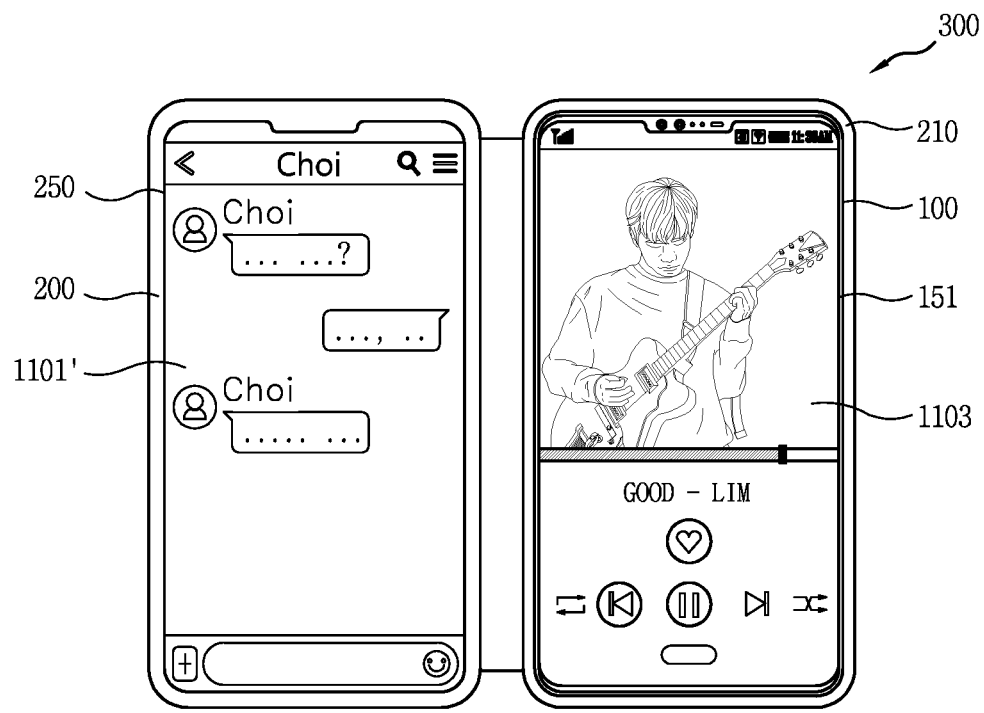

As illustrated in FIG. 11A, in a state where different types of screen information, for example, first screen information 1101 and second screen information 1102 are respectively displayed on the first and second display units 151 and 250, when a preset touch gesture is applied to the first display unit 151, the first screen information 1101 displayed on the first display unit 151 may be moved to the second display unit 250.

Here, moving screen information corresponds to moving a task. In some examples, the preset touch gesture may be a multi-finger touch gesture (e.g., a three-finger touch gesture) which is applied to the first display unit 151 and dragged from the first display unit 151 toward the second display unit 250.

The message chat screen that was displayed as the first screen information 1101 on the first display unit 151 is displayed on the second display unit 250. In addition, new messages transmitted and received in relation to the corresponding message chat screen are also displayed on a message chat screen 1101' displayed on the second display unit 250.

To this end, the controller of the mobile terminal 100 transmits an image signal corresponding to a task related to the message chat screen to the second display unit 250 through the first and second wired communication units 161 and 243 and the wiring unit 242.

Third screen information 1103, which was previously layered below the first screen information 1101 among applications that are being executed in the background is displayed on the first display unit 151.

Figure 12A:
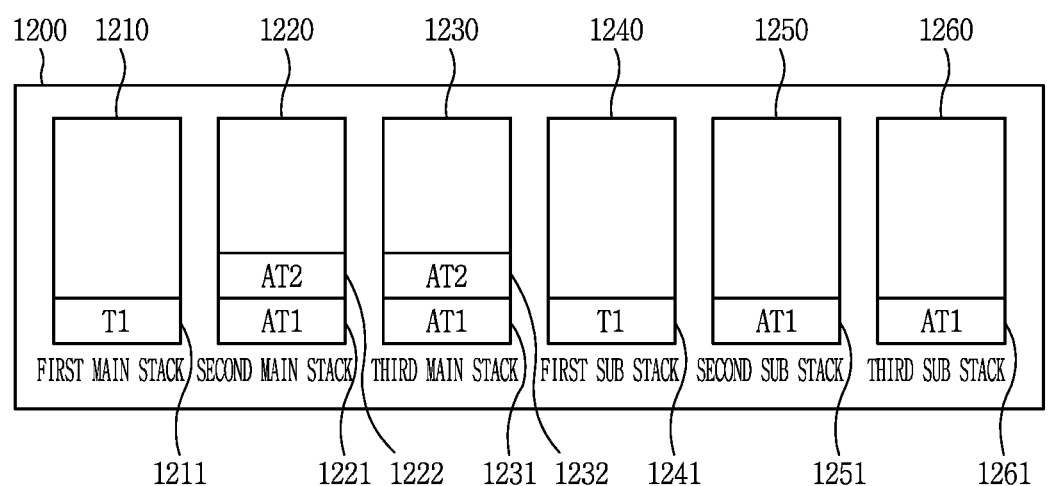
Figure 12B:
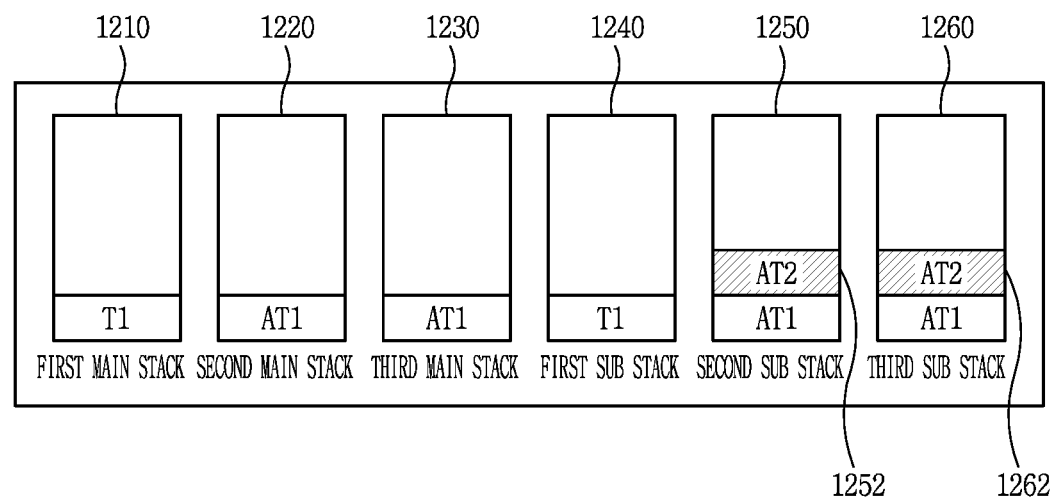

Regarding handling of the stack, as illustrated in FIG. 12A, tasks included at the top of a second main stack 1220 and a third main stack 1230 are deleted, and the deleted tasks are pushed onto a second sub stack 1250 and a third sub stack 1260, respectively. Accordingly, tasks 1252 and 1262 related to the message chat screen are newly pushed onto the second and third sub stacks 1250 and 1260. As such, a case in which a task deleted from one stack is pushed onto another stack may be defined as "movement of a task".

Hereinafter, an operation of transmitting second screen information 1102, for example, a video playback screen displayed on the second display unit 250 to the first display unit 151 will be described, with reference to FIGS. 11C, 11D, 12A and 12C.

Figure 11C:
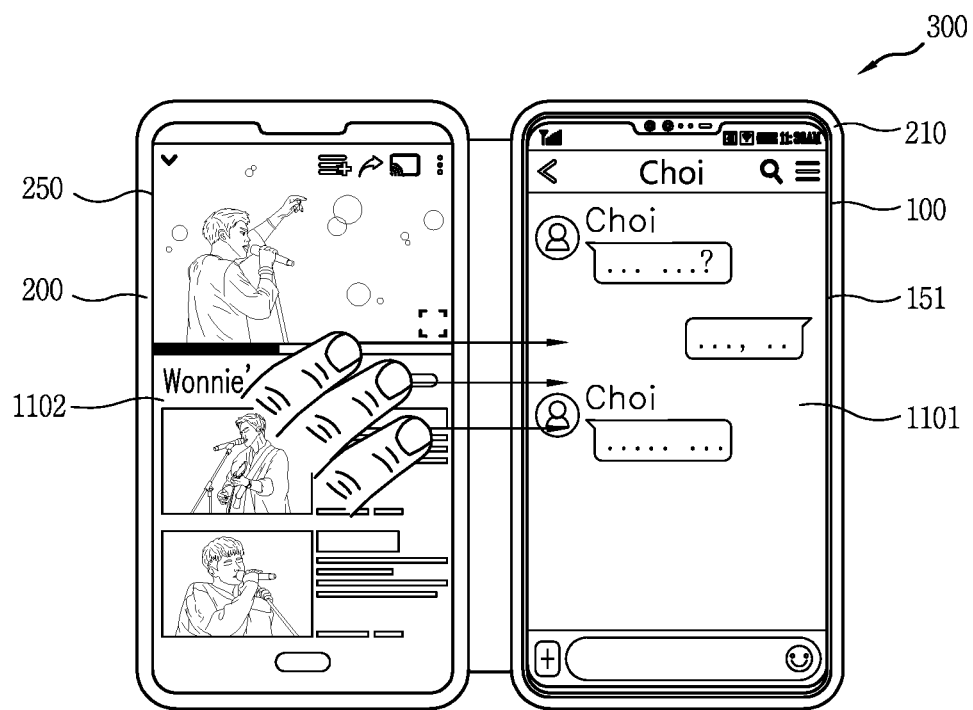
Figure 11D:
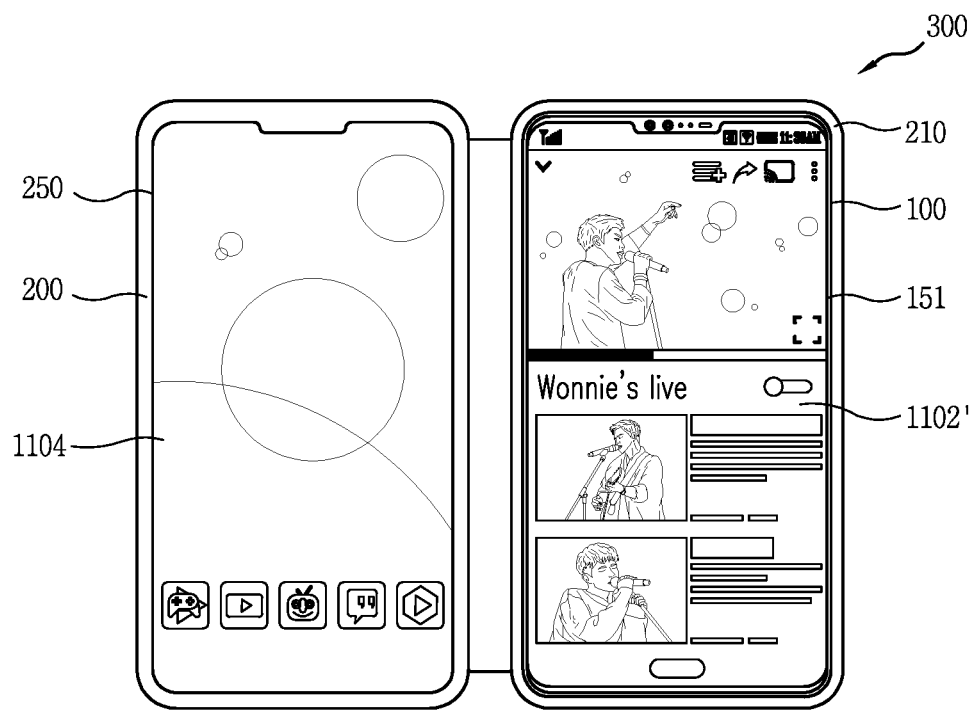

As illustrated in FIG. 11C, in the state where the different types of screen information, for example, the first screen information 1101 and the second screen information 1102 are displayed on the first and second display units 151 and 250, when a preset touch gesture is applied to the second display unit 250, the second screen information 1102 displayed on the second display unit 250 may be moved to the first display unit 151.

Here, moving screen information may be used as the same meaning as moving a task. In addition, the preset touch gesture may be a multi-finger touch gesture (e.g., a three-finger touch gesture) which is applied to the second display unit 250 and dragged from the second display unit 250 toward the first display unit 151.

Now, the video playback screen that was displayed as the second screen information 1102 on the second screen information unit 250 is displayed on the first display unit 151. A corresponding video playback screen 1102' is continuously reproduced on the first display unit 151 without interruption.

Different screen information layered below the second screen information 1102 among applications that are being executed in the background is displayed on the second display unit 250. At this time, if there is not any different screen information, a second home screen page 1104 is exposed.

Meanwhile, explaining a stack structure related to this, as illustrated in FIG. 12A, tasks stacked on top of the second sub stack 1250 and the third sub stack 1260 are deleted, and the deleted tasks are inserted into the second main stack 1220 and the third main stack 1230, respectively.

Figure 12C:
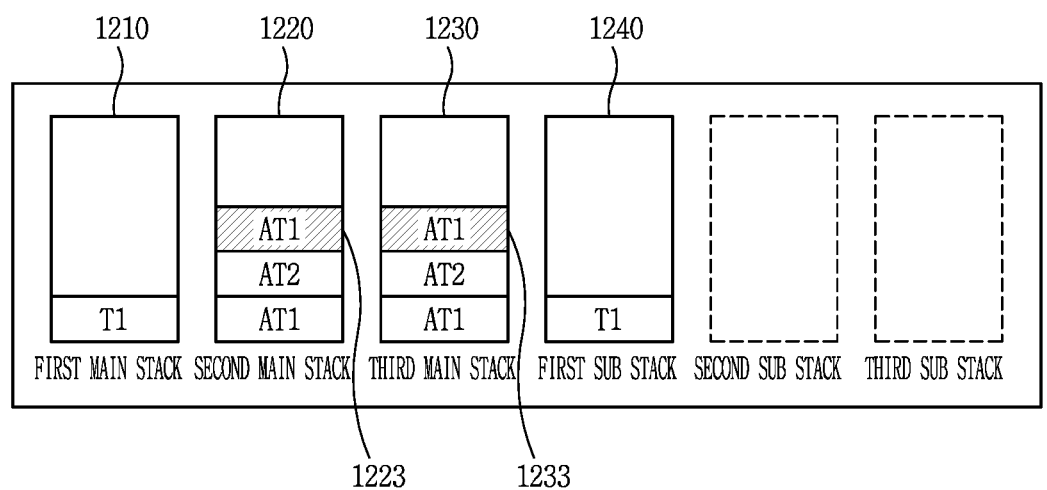

Accordingly, as illustrated in FIG. 12C, tasks 1223 and 1233 related to the second screen information 1102, namely, the video playback screen are inserted into the second and third main stacks 1220 and 1230 on top of the tasks related to the existing first screen information 1101. That is, the tasks are moved from the second and third sub stacks to the second and third main stacks 1220 and 1230.

On the other hand, as illustrated in FIG. 12D, if there is no execution screen of another application layered below after moving the screen, the home screen page 1104 is displayed on the second display unit 250. Accordingly, as illustrated in FIG. 12C, the second and third sub stacks are deleted from the memory, and only the first sub stack 1240 remains as the stack for the second display unit 250.

To this end, when it is determined that there are no more tasks included in the second sub stack after deleting the tasks included in the second sub stack, the controller of the mobile terminal 100 deletes the second sub stack. And, the controller of the mobile terminal 100 transmits an image signal corresponding to a second home screen page to the second display unit 250 through the first and second wired communication units 161 and 243 and the wiring unit 242, so that the second home screen page corresponding to the task included in the first sub stack is displayed on the second display unit 250.

Although not shown, first and second screen information displayed on the first and second display units 151 and 250 may also be switched with each other. In this case, a task included on top of a main stack generated for the first display unit 151 and a task included on top of a sub stack generated for the second display unit 250 are deleted, respectively. The deleted tasks are then switched to be inserted into the sub stack and the main stack. That is, the task corresponding to the first screen information is moved to the sub stack, and simultaneously the task corresponding to the second screen information is moved to the main stack.

Hereinafter, description will be given of an operation for checking different execution depths at once in a state where the second display unit 250 mirrors a screen displayed on the mobile terminal 100, and a multi-stack structure according to the operation, with reference to FIGS. 13A to 13C and 14A to 14C.

Figure 13A:
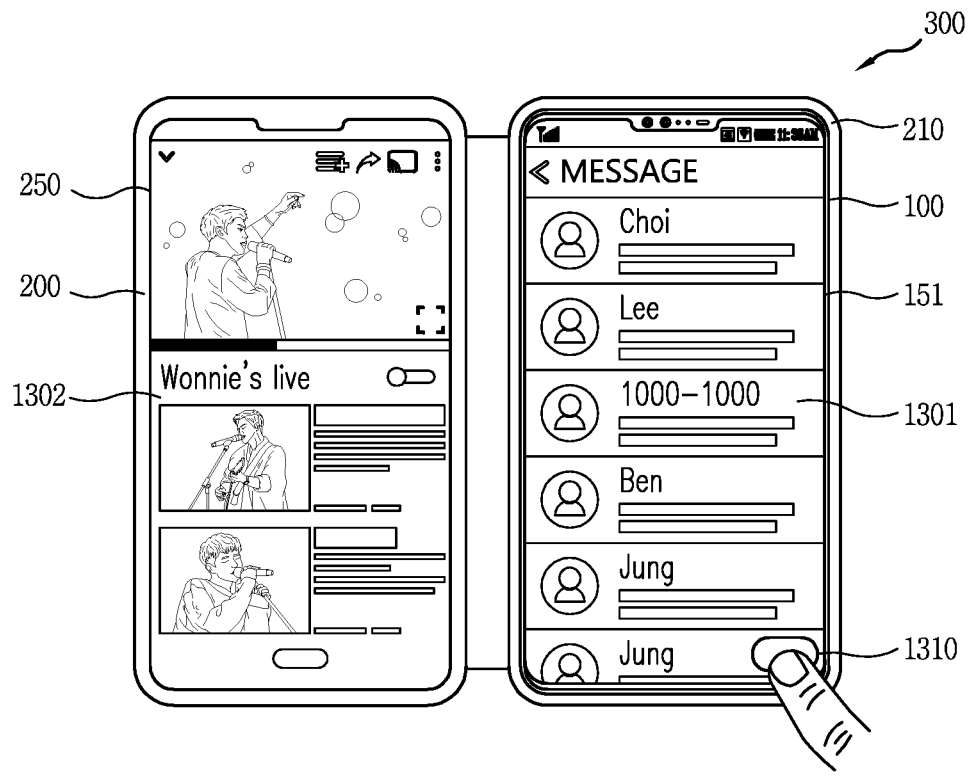

Referring to FIG. 13A, in a state where first screen information 1301 and second screen information 1302 are displayed on the first and second display units 151 and 250 of the electronic device 300, respectively, the controller of the mobile terminal 100 may detect reception of an input for the second display unit 240 to mirror the first screen information 1301, for example, a message list screen displayed on the first display unit 151.

For example, as illustrated in FIG. 13A, an icon 1310 for executing a mirroring operation may be displayed in one area of the first display unit 151, and the mirroring operation may be performed based on a touch input applied to the icon 1310.

Figure 13B:

Specifically, when a touch input is applied to the icon 1310, the controller of the mobile terminal determines whether a touch signal corresponding to the touch input is for performing the mirroring operation, and transmits an image signal corresponding to the first screen information 1301 to the second display unit 250 through the first and second wired communication units 161 and 243 and the wiring unit 242. In addition, the second display unit 250 converts the image signal transmitted in a DP format into a signal in an MIPI format, which is to be output to the second display unit 250, through the data conversion unit 282, and then displays the same screen information 1301' as the first screen information 1301 as illustrated in FIG. 13B.

That is, the screen information 1301' is a screen mirroring the activities of an application corresponding to the first screen information 1301 as it is, and has the same execution depth corresponding to the first screen information 1301.

Figure 14A:
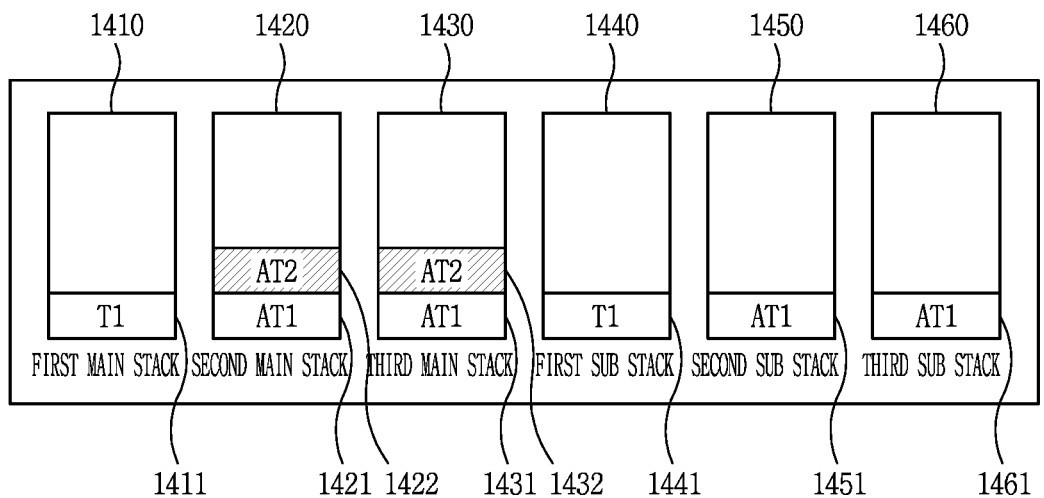
Figure 14B:
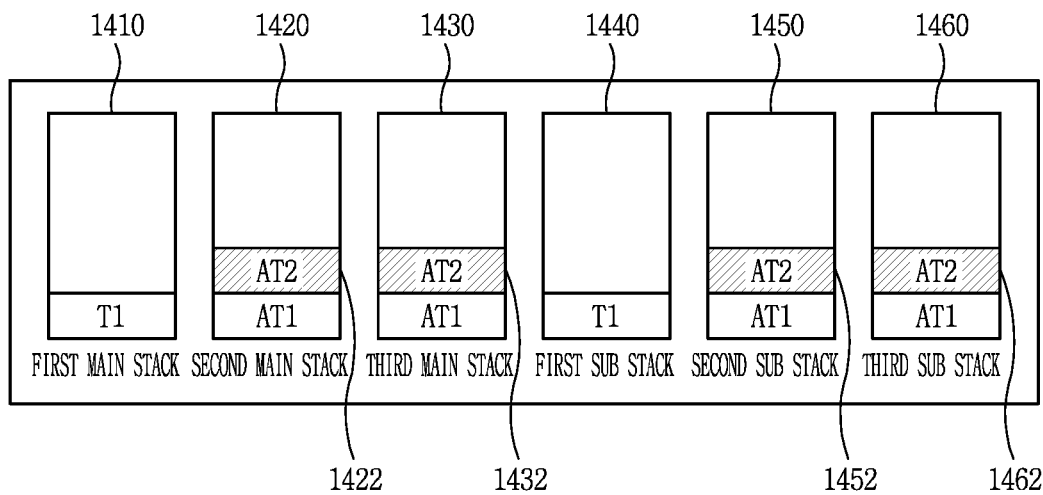

In this regard, referring to FIGS. 14A and 14B, tasks 1422 and 1432 related to the first screen information 1301 stacked on top of second and third main stacks 1420 and 1430 are copied and inserted into second and third sub stacks 1450 and 1460 generated for the second display unit 250. This realizes a structure in which the same tasks 1422, 1432, 1452, and 1462 are stacked on top of the second and third main stacks 1420 and 1430 and the second and third sub stacks 1450 and 1460.

Thereafter, the controller of the mobile terminal 100 may change an execution depth of a first application corresponding to the first screen information, based on a touch input applied to the first screen information 1301 displayed on the first display unit 151. FIG. 13B illustrates that the execution depth is increased by one level, for example by opening a particular message or message thread from a displayed message list screen 1301. However, in another example, the execution depth may be decreased or increased/decreased by multiple levels.

The controller of the mobile terminal displays third screen information 1303 of the first application corresponding to the changed execution depth on the first display unit 151.

Figure 13C:
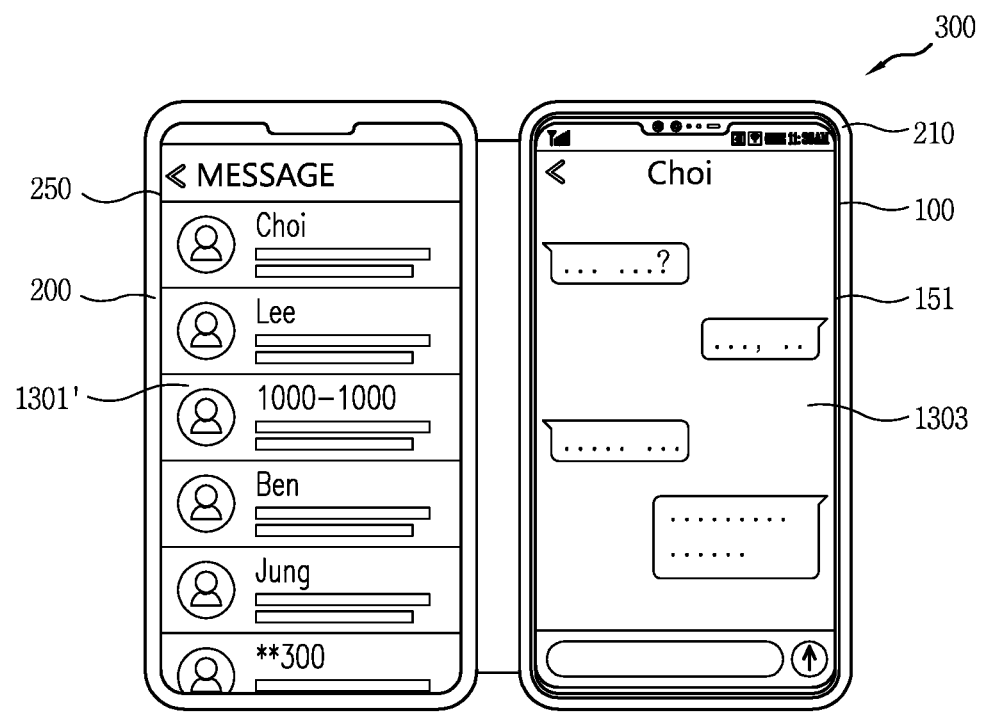

For example, referring to FIGS. 13B and 13C, when a touch input is applied to a specific item among a plurality of items included in the message list screen 1301 displayed on the first display unit 151, the message list screen 1301 displayed on the first display unit 151 is switched to a message chat screen 1303 corresponding to the touch-applied item. At this time, the display state of the message list screen 1301' mirrored to the second display unit 250 is maintained.

Figure 14C:
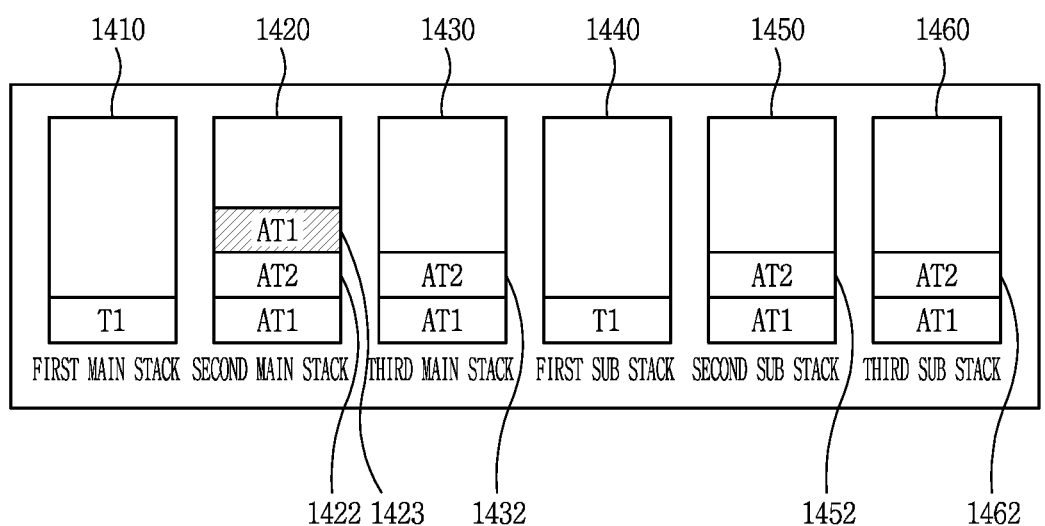

In this regard, as illustrated in FIG. 14C, while the tasks related to the first screen information 1301' mirrored to the second and third sub stacks 1450 and 1460 are maintained, a task 1423 related to the third screen information is newly inserted into the second main stack 1420 (or only activity of the task 1422 associated with the existing first screen information may change). At this time, since there is no change in the application, the third main stack 1430 maintains the existing stack structure.

Hereinafter, description will be given of an operation of selectively transmitting an execution screen of a specific application to the second display unit 250 using a list screen of recently-executed applications in the mobile terminal, and a multi-stack structure according to the operation, with reference to FIGS. 15A to 15C and 16A to 16C.

Figure 15A:
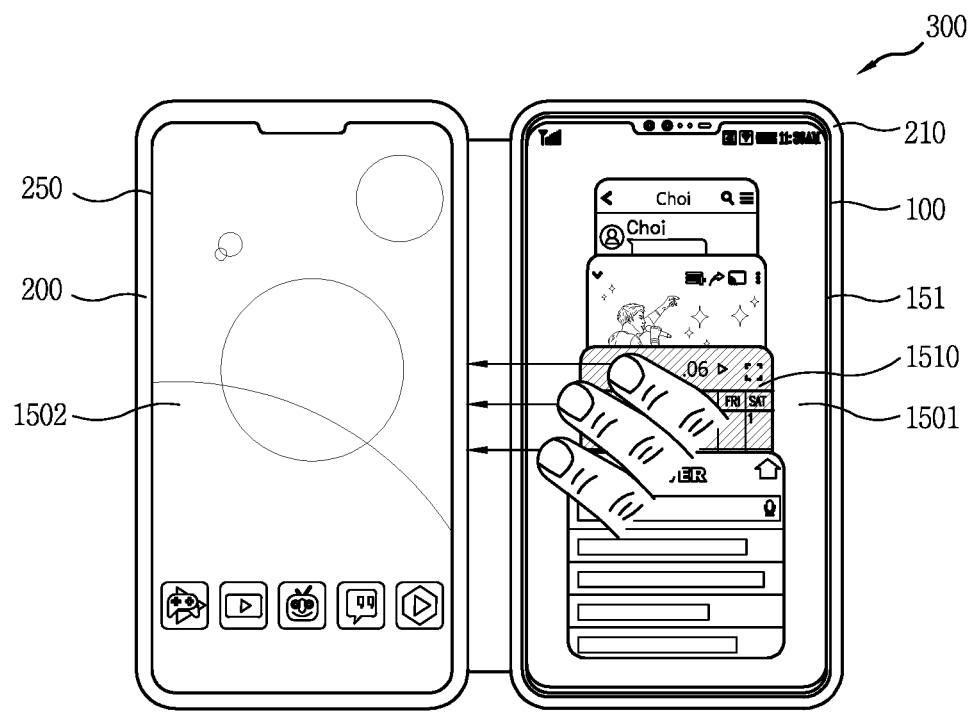

Referring to FIG. 15A, when a predetermined input is applied in a state where the first and second display units 151 and 250 of the electronic device 300 are activated, a list screen 1501 of recently-executed applications may be displayed on at least one display unit, for example, the first display unit 151. A display order of execution screens of a plurality of applications included in the list screen 1501 may correspond to a stacking order of a third main stack.

To this end, in the memory of the mobile terminal 100 may be generated a third main stack including application tasks corresponding to tasks included in a second main stack, where each task in the third main stack are configured according to application units, and a third sub stack including application tasks corresponding to tasks included in a second sub stack, where each task in the third sub stack are configured according to application units.

That is, the third main stack may be generated at the same time when the second main stack is generated, and the third sub stack may be generated when the second sub stack is generated.

In addition, in a state where a list screen 1501 corresponding to execution tasks included in a third main stack 1630 (see FIG. 16A) is displayed on the first display unit 151, the controller of the mobile terminal 100 may detect a preset input for moving an execution screen 1510 of a specific application selected from the list screen 1501 to the second display unit 250, based on a touch input.

Here, the preset input may refer to a touch gesture of dragging, for example, the execution screen 1510 of the specific application selected toward the second display unit 250 through a multi-finger touch input.

Accordingly, similar to the screen sending (moving) operation described above, the execution screen 1510 of the selected specific application is moved from the first display unit 151 to the second display unit 250. To this end, the controller of the mobile terminal may transmit an image signal corresponding to the execution screen 1510 of the selected specific application to the second display unit 250 through the first and second wired communication units 161 and 243 and the wiring unit 242.

Meanwhile, since the execution screen 1510 of the selected specific application does not necessarily match the stacking order of the third main stack, the mobile terminal 100 may perform stack adjustment for moving a task related to the execution screen 1510 of the selected specific application.

Figure 16A:
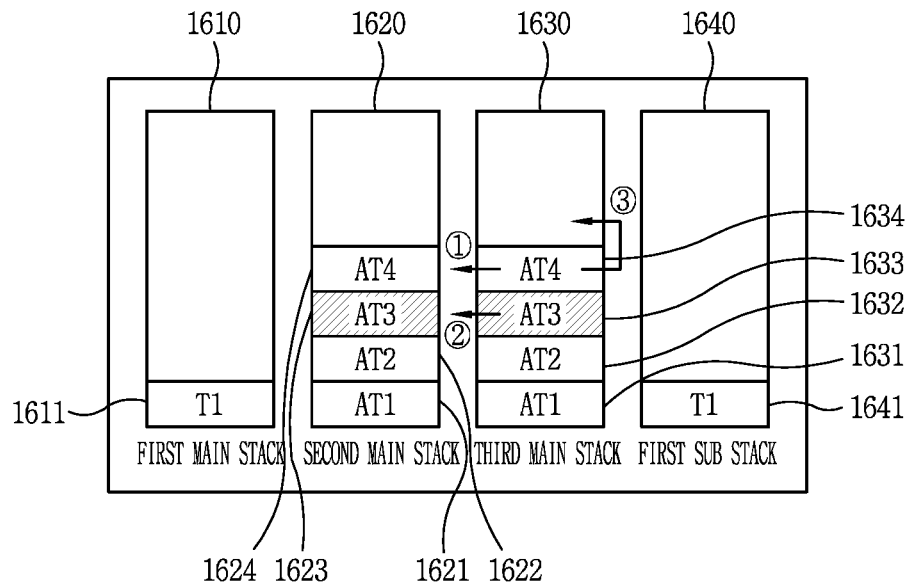
Figure 16B:
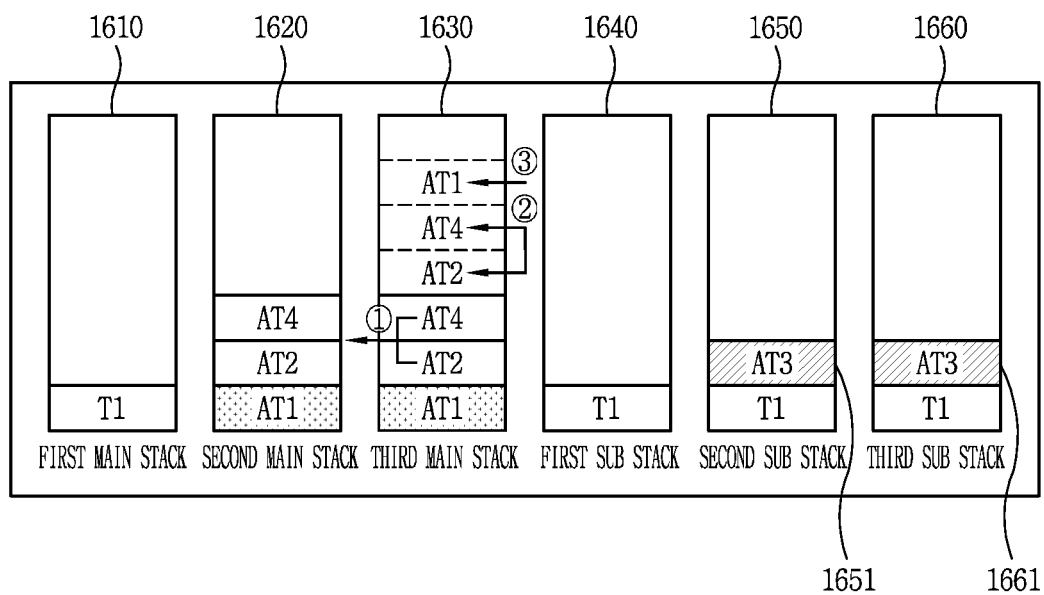
Figure 16C:
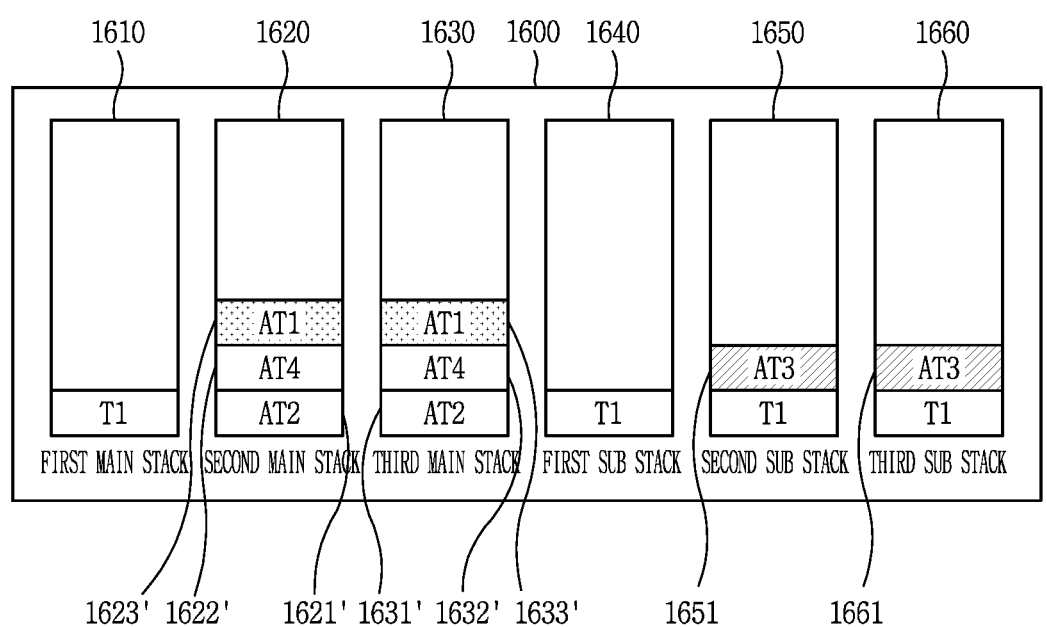

Specifically, referring to FIGS. 16A and 16B, since a specific task (AT3) 1623 positioned in the middle of a third main stack 1630 is selected as a task to move from the third main stack 1630 to second and third sub stacks 1650 and 1660, a task (AT4) 1624 located on a top of the specific task 1623 has to be first deleted in order to delete the specific task (AT3) 1623 (①). Only then, the specific task (AT3) 1623 can be deleted (②).

At this time, the task (AT4) 1624 first deleted from the third main stack 1630 is moved to a temporary stack (not shown). The specific task (AT3) 1623 is moved to newly generated second and third sub stacks 1650 and 1660. After the specific task (AT3) 1623 is deleted and moved in this manner, the task (AT4) 1624 stored in the temporary stack is stacked on top of the third main stack 1630 again (③).

As such, when the stacking order of the third main stack 1630 is changed, it may be said that the stack alignment is performed. Meanwhile, at the same time as or after the stack alignment with respect to the third main stack 1630, stack alignment with respect to the second main stack 1620 is similarly performed.

As such, the controller of the mobile terminal performs stack adjustment for the second and third main stacks 1620 and 1630, so that the tasks (AT3) 1623 and 1624 associated with the selected application for movement are deleted from the second and third main stacks 1620 and 1630 for the first display unit 151. In addition, the second and third sub stacks 1650 and 1660 are generated to insert the deleted tasks associated with the selected application into the second and third sub stacks 1650 and 1660.

Figure 15B:
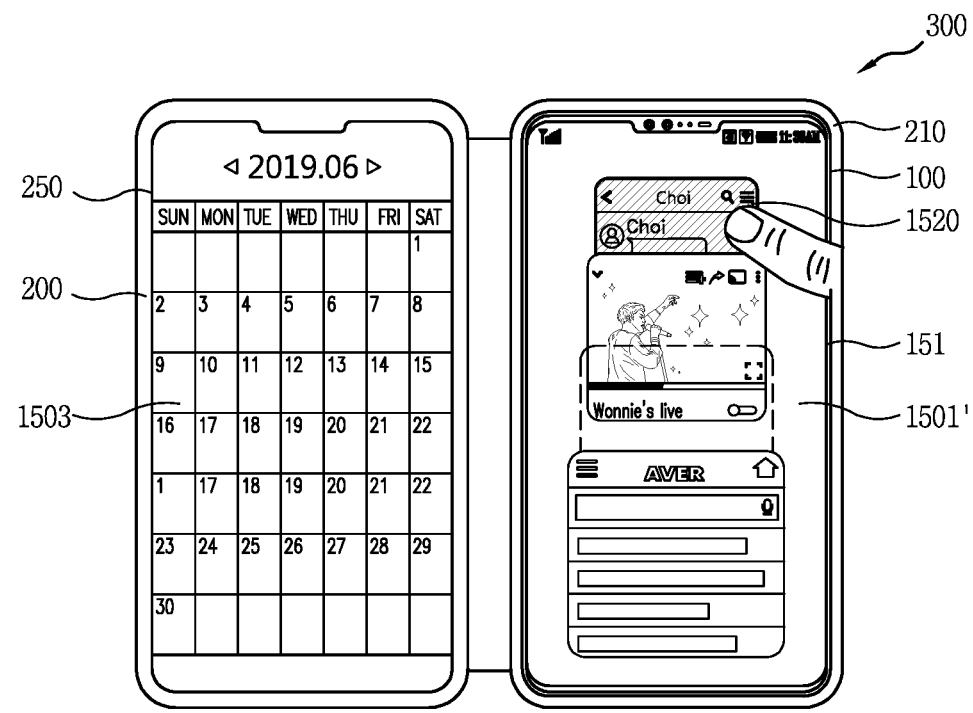
Figure 15C:

Accordingly, as illustrated in FIG. 15B, an execution screen 1503, for example, a calendar screen corresponding to the selected application is displayed on the second display unit 250.

To this end, the controller of the mobile terminal 100 may transmit an image signal corresponding to the execution screen of the selected application to the second display unit 250 through the first and second wired communication units 161 and 243 and the wiring unit 242, so that the execution screen is output to the second display unit 250. In addition, an item of the execution screen 1503 moved to the second display unit 250 may be deleted from the list screen 1501' displayed on the first display unit 151.

In addition, while the execution screen 1503 of the selected application is displayed on the second display unit 250, when a touch input is applied to any one execution screen 1520, for example, an execution screen displayed at the rear on the list screen 1501' displayed on the first display unit 151, the controller of the mobile terminal 100 may perform adjustment so that a task related to the execution screen 1520 to which the touch input has been applied is located on top of the second and third main stacks 1620 and 1630.

In detail, the controller of the mobile terminal deletes the upper tasks 1632 and 1634 in the stacking order (i.e., first deleting AT4 and then deleting AT2) (①), so that the task (AT1) associated with the selected execution screen 1520 is located on the top of the third main stack 1630, and moves the deleted tasks to a first temporary stack (not shown). This is repeatedly performed until a task (AT1) 1631 associated with the selected execution screen 1520 appears.

The controller of the mobile terminal moves the task (AT1) 1631 associated with the selected execution screen 1520 to a second temporary stack which is distinguished from the first temporary stack.

Next, all of the tasks 1632 and 1634 stored in the first temporary stack are moved back to the third main stack 1630 (②), and then the first temporary stack is deleted. When the first temporary stack is deleted, the task (AT1) 1631 stored in the second temporary stack is taken out and inserted into the top of the third main stack 1630 (③).

As such, after the stack alignment with respect to the third main stack 1630, the stack alignment with respect to the second main stack 1620 is repeatedly performed.

Figure 17A:
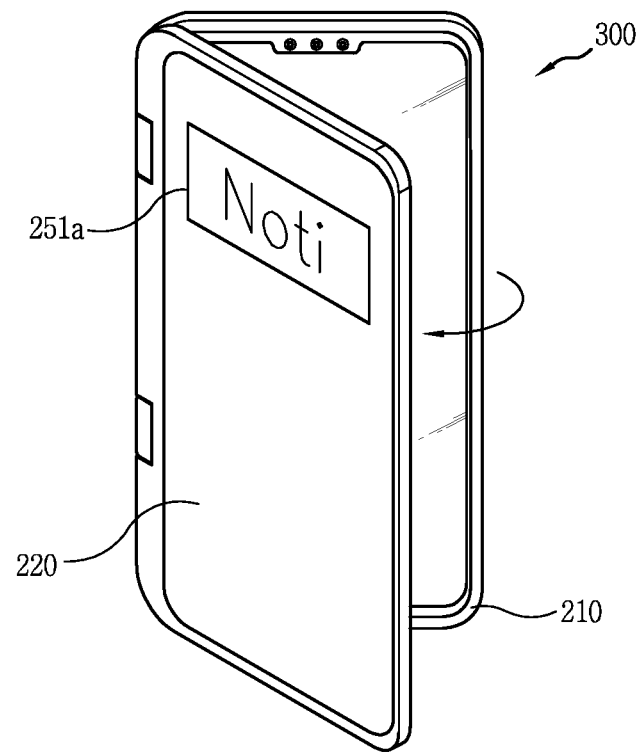

Hereinafter, an exemplary operation of outputting notification information when an event occurs in the closed state of an electronic device 300 and immediately checking the notification information in the open state of the electronic device 300 will be described in detail, with reference to FIGS. 17A and 17B.

As described above, the first and second display units 151 and 250 of the electronic device 300 according to the present disclosure may have one of the closed state and the open state. The closed state may be switched to the open state according to relative rotation of the first and second bodies 210 and 220.

In the closed state, the first and second display units are covered by each other and maintained in an inactive state. Therefore, it is difficult to confirm specific information in the closed state.

Accordingly, the electronic device 300 according to the present disclosure may be provided with a third display unit 251a on a front-facing side of the second body (facing the front in when the device is in the closed position) 220 for confirming event-related information even in the closed state when the event related to an application installed in the mobile terminal occurs in the closed state.

The third display unit 251a may be formed to have a predetermined size on an upper portion of the front surface of the second body 220, and may be layered with a touch sensor. In addition, the third display unit 251a may be configured to display predetermined information in a normal mode, and operate to display event-related information in an operating mode in response to the occurrence of the event.

To this end, in a state where the mobile terminal is coupled to the first body 210 of the case, the mobile terminal 100 may recognize a third resistor associated with the third display unit 251a, and supply an operating current to the third display unit 251a even in the closed state.

Also, when an occurrence of an event related to at least one application installed in the mobile terminal is detected in the closed state, the controller of the mobile terminal 100 may transmit a signal for outputting information related to the event to the third display unit 251a to the third display unit through the first and second wired communication units 161 and 243 and a wiring unit (not shown) connected to a circuit board of the third display unit 251a.

Figure 17B:
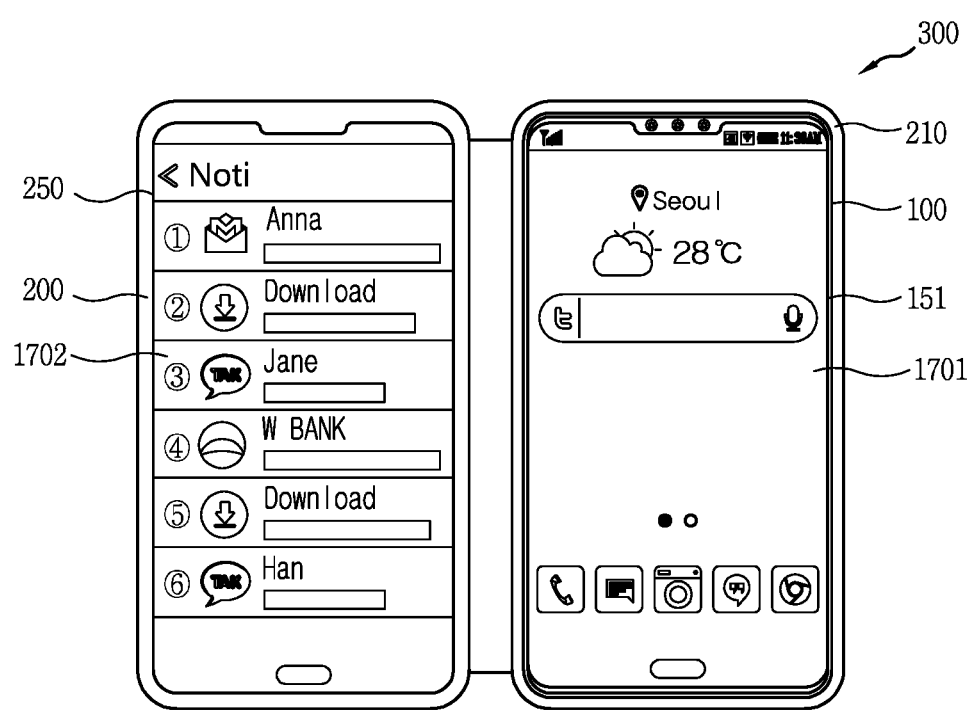

Thereafter, as the electronic device 300 is switched from the closed state to the open state, as illustrated in FIG. 17B, the controller of the mobile terminal 100 may activate the second display unit 250 and transmit a corresponding image signal to the second display unit through the first and second wired communication units and the wiring unit, so that screen information 1702 corresponding to the event, for example, a message list screen is output to the activated second display unit 250.

In addition, in response to the switching from the closed state to the open state, the controller of the mobile terminal 100 may generate a first main stack including a task related to a first home screen page 1701 displayed on the first display unit 151, second and third sub stacks including tasks associated with the screen information 1702 corresponding to the event, displayed on the first display unit 151, and a first sub stack including a task related to a second home screen page (not shown).

Hereinafter, description will be given of examples for explaining in detail various operation modes according to a degree that the first body and the second body rotate relative to each other in the open state of the electronic device 300 according to the present disclosure, with reference to FIGS. 18A to 18D, 19A, and 19B.

First, referring to FIGS. 18A to 18D, when the first and second display units 151 and 250 of the electronic device 300 are switched from the closed state to the open state, a state change from the open state may be detected according to a degree that the first body and the second body rotate relative to each other, and thus a different display mode may be performed.

Figure 18A:
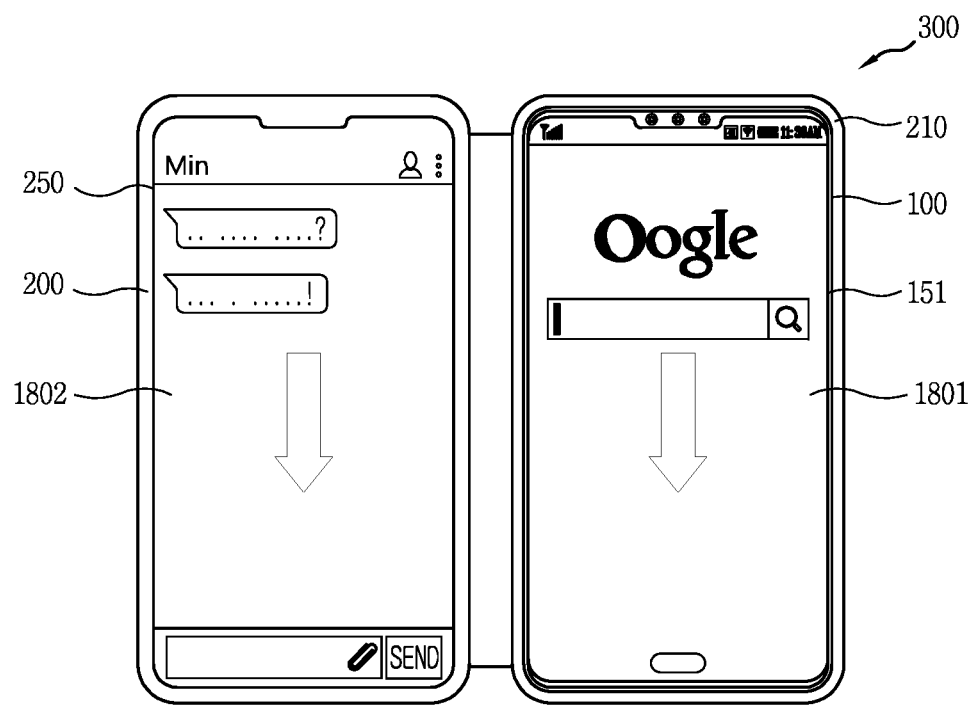
Figure 18B:
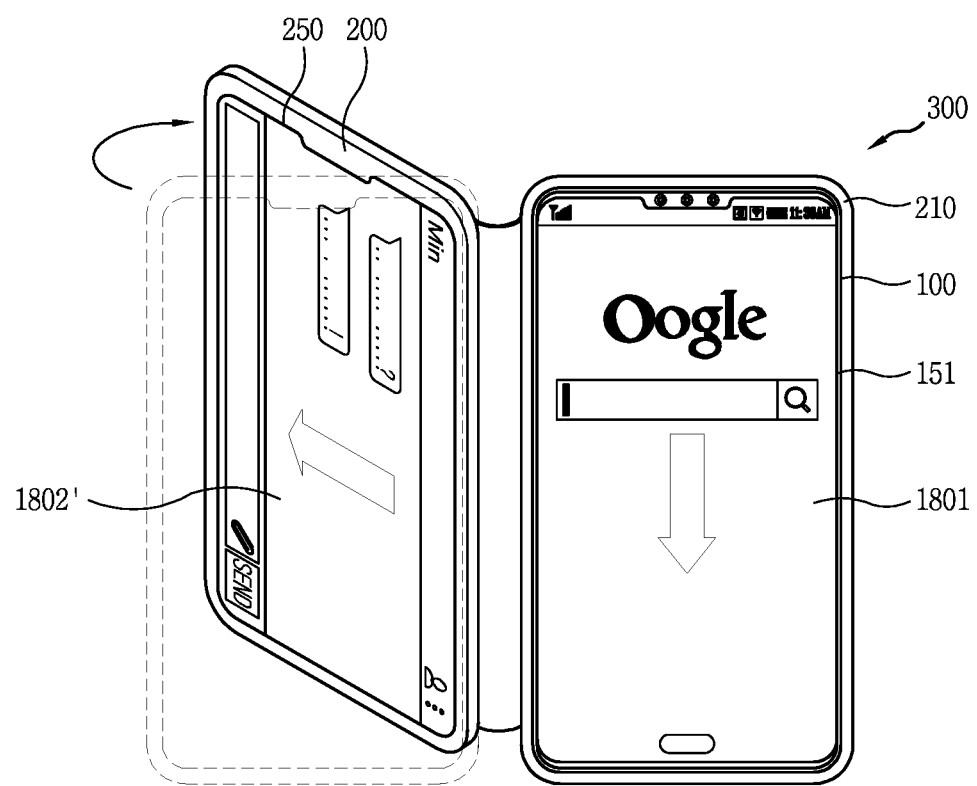

Specifically, in a state where the first and second bodies form 180 degrees as illustrated in FIG. 18A, when the first and second bodies are rotated relative to each other to be in a folded (bent) state in which the rear side of the second body 220 faces the rear side of the first body 210, as illustrated in FIG. 18B, a display mode for screen information 1802 displayed on the second display unit 250 may be changed from a portrait (vertical) direction to a landscape (horizontal) direction.

Figure 18C:
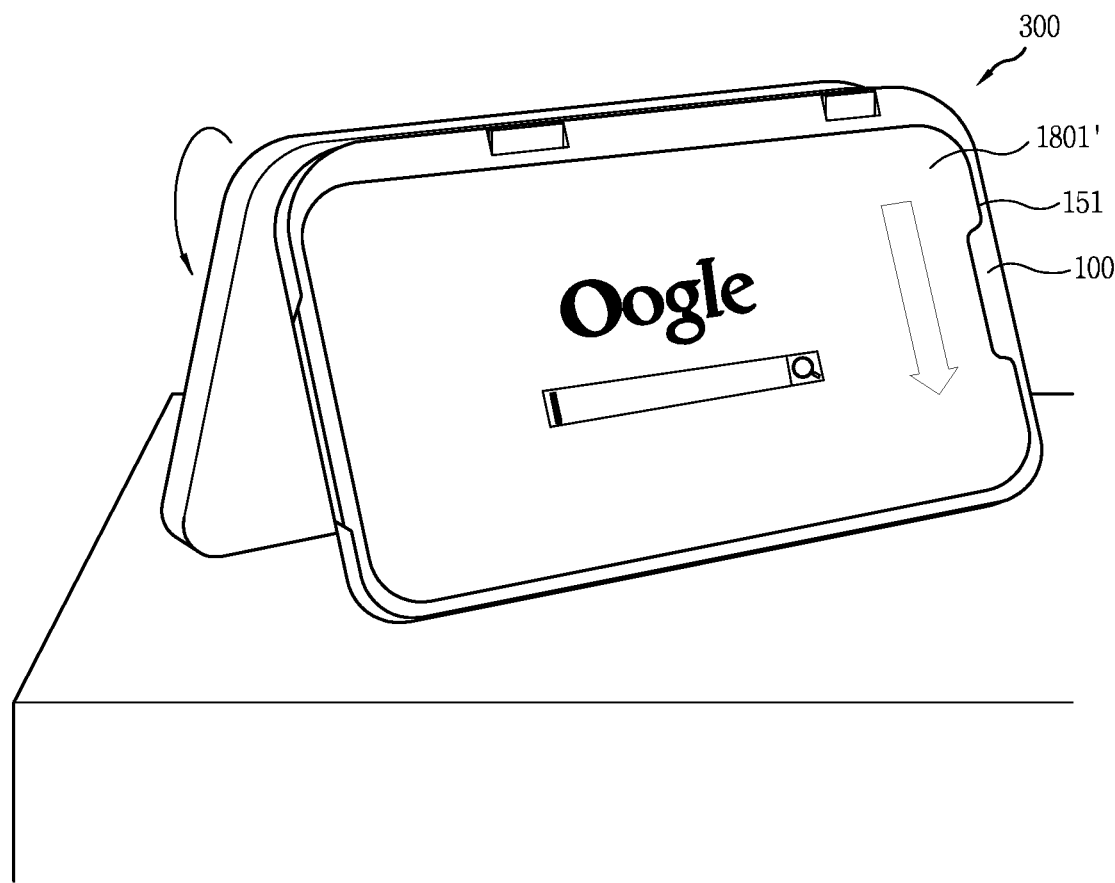

Also, when it is detected that the first and second bodies are further rotated relative to each other in the folded (bent) state so that the rear side of the second body 220 faces the rear side of the first body 210, as illustrated in FIG. 18C, to be erected on the floor so that the connection unit 230 of the electronic device 300 is located at the uppermost side and side surfaces of the first and second bodies 210 and 220 are located opposite to the connection unit, the display mode for screen information 1801' displayed on the first display unit 151 may also be changed from the portrait direction to the landscape direction while the screen information 1802 is kept displayed on the second display unit 250 in the landscape direction.

Figure 18D:
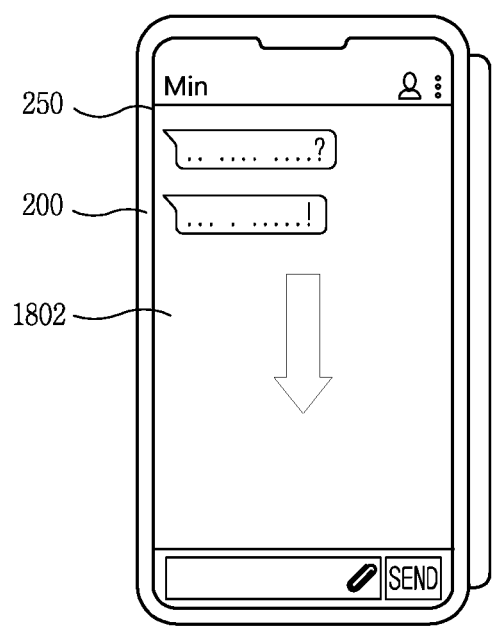

Further, when it is detected that the first and second bodies 210 and 220 are further rotated relative to each other in a fully open state, to be in a flip state in which the rear side of the second body 220 and the rear side of the first body 210 abut each other, the display mode for the screen information displayed on the second display unit 250 may be switched back to the portrait direction, as shown in FIG. 18D.

Meanwhile, the foregoing embodiments may be variously modified according to types of screens displayed on the first and second display units 151 and 250.

Figure 19A:
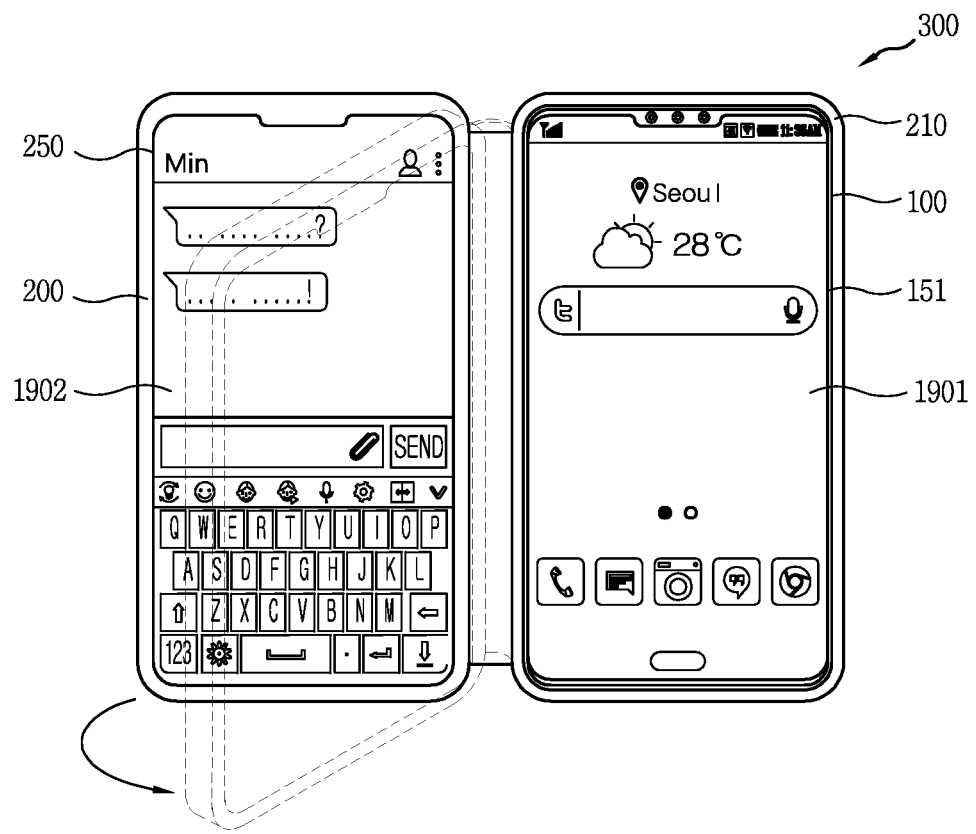
Figure 19B:
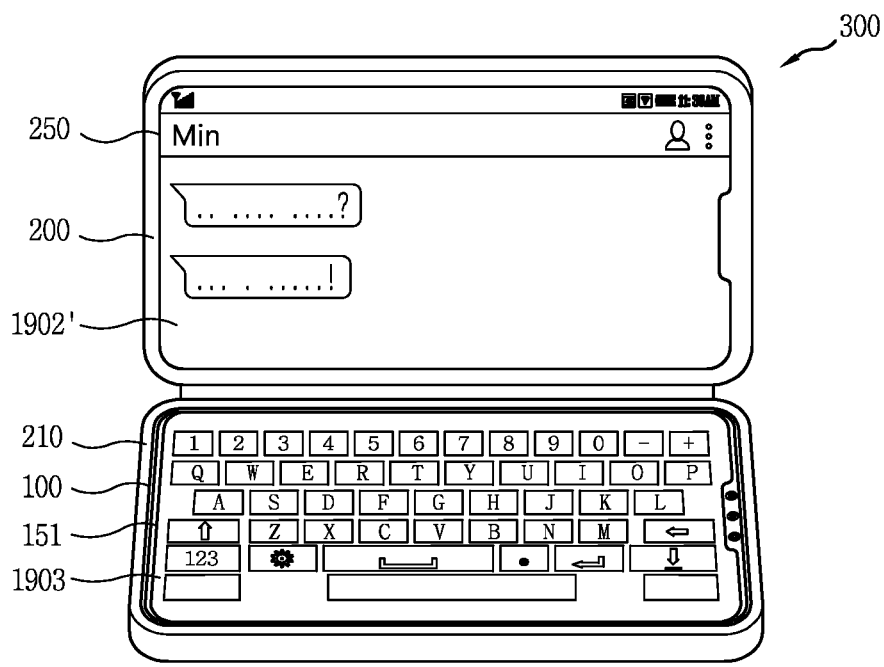

Next, referring to FIGS. 19A and 19B, in a state where the second display unit 250 is in an active state and the first and second bodies form 180 degrees, when the first and second bodies 210 and 220 rotate such that the first and second display units 151 and 250 are rotated toward each other, a type of screen information displayed on the first direction unit 151 may be differently decided depending on a type of screen information displayed on the second display unit 250.

For example, in a state in which a message screen 1902 including a message output area and a message input area is displayed on the second display unit 250 as illustrated in FIG. 19A, when the device is folded such that the displays are rotated toward each other and it is also detected that the rear side of the first body 210 is placed on a surface (for example, a tabletop, such that the first display is facing up and the second display is angled toward the user), an operation mode may be changed such that the message output area is displayed on the second display unit 250 and the message input area is displayed on the first display unit 151, such as, for example, a laptop computer.

On the other hand, although not shown, when a video screen is displayed on the second display unit 250, the first display unit 151 may display a list of other recommended videos related to the video screen currently-displayed on the second display unit 250.

In addition, the various states in the open state may be detected by a separate sensor provided in the connection unit 230 or a hinge disposed inside the connection unit 230, according to a position gripped by a user, according to whether or not a component, such as a rear camera, of the mobile terminal exposed to the rear side of the first body is obstructed, and the like.

As described above, in a mobile terminal and an electronic device having the mobile terminal according to the present disclosure, more convenient and easier screen control and access can be realized by utilizing a plurality of displays. In detail, each of screens displayed on a plurality of displays can be independently controlled, and also the plurality of displays can be used as one expanded display. In addition, a screen can be moved from one display to another or different execution depths of the same application can be simultaneously confirmed and entered based on a mirroring function. Events can be confirmed even in a closed state of the electronic device and also information corresponding to the event can be provided as soon as the electronic device being switched to an open state. Various opened states realized by a plurality of displays can be detected so as to provide operation modes useful for a user, thereby improving usability and satisfying user convenience at the same time.

What is claimed is:

1. An electronic device comprising:
a case;
a mobile terminal configured to be coupled with the case and comprising:
a controller;
a connection port provided at one side of the mobile terminal;
a first display; and
wherein the case comprises:
a first body configured to accommodate at least part of the mobile terminal;
a connector protruding inward at one side of the first body and configured to engage with the connection port when the mobile terminal is accommodated at the first body;
a second body comprising a second display; and
a wiring unit electrically connecting the first body and the second body and configured to transfer a signal from the mobile terminal to the second display,
wherein the controller of the mobile terminal is configured to:
detect engagement between the connector and the connection port;
transmit a signal to the second display for switching the second display to an active state when a first preset touch is received at the first display or the second display;
generate a sub stack and insert into the sub stack a task related to screen information to be displayed at the second display,
generate a second main stack and insert into the second main stack a task related to a first application in response to execution of the first application;
generate a second sub stack and insert into the second sub stack a task related to a second application in response to execution of the second application, while the sub stack for the screen information at the second display is maintained;
cause the first display to display first screen information corresponding to the task inserted into the second main stack; and
cause the second display to display second screen information corresponding to the task inserted into the second sub stack.

2. The electronic device of claim 1, wherein the controller is further configured to:
transmit a signal to the second display for switching the second display unit to an inactive state when a second preset touch is received at the second display while the screen information displayed at the second display; and
delete the sub stack when the second display is switched to the inactive state.

3. The electronic device of claim 1, wherein
the first application is executed via a first home screen page displayed at the first display,
the second application is executed via a second home screen page displayed at the second display, while a first sub stack for the second home screen page is maintained, and
the second screen information is displayed corresponding to the task inserted into the second sub stack by transmitting a display signal to the second display via the wiring unit.

4. The electronic device of claim 3, wherein the controller is further configured to:
receive an input for expanding a size of the first screen information displayed at the first display;
insert into the second sub stack a task corresponding to the first screen information included in the second main stack;
cause the first display to display a first part of an expanded first screen information; and
cause the second display to display a remaining second part of the expanded first screen information by transmitting a display signal to the second display via the wiring unit.

5. The electronic device of claim 4, wherein the controller is further configured to:
receive an input for restoring the size of the first screen information while the expanded first screen information is displayed across the first and second displays;

cause the first display to display a reduced size first screen information and cause the second display to cease displaying the remaining second part of the expanded first screen information;
delete the task corresponding to the first screen information from the second sub stack; and
cause the second display to display the second screen information by transmitting a display signal to the second display via the wiring unit.

6. The electronic device of claim 3, wherein the controller is further configured to:
receive an input for moving the first screen information to the second display;
delete the task corresponding to the first screen information from the second main stack;
insert the deleted task into the second sub stack; and
cause the second display to display the first screen information by transmitting a display signal to the second display via the wiring unit.

7. The electronic device of claim 3, wherein the controller is further configured to:
receive an input for moving the second screen information to the first display;
delete the task corresponding to the second screen information from the second sub stack;
insert the deleted task into the second main stack; and
cause the first display to display the second screen information.

8. The electronic device of claim 7, wherein the controller is further configured to:
delete the second sub stack when it is determined that it is empty after deletion of the task corresponding to the second screen information; and
cause the second display to display the second home screen page corresponding to the task included in the first sub stack.

9. The electronic device of claim 3, wherein the controller is further configured to:
receive an input for mirroring the first screen information on the second display;
insert another task related to the first screen information into the second sub stack and cause the second display to display the first screen information by transmitting a display signal to the second display via the wiring unit while the first screen information is also displayed on the first display unit.

10. The electronic device of claim 9, wherein the controller is further configured to:
change an execution depth of the first application based on a touch input applied to the first screen information displayed at the first display;
cause the first display to display third screen information of the first application corresponding to the changed execution depth; and
insert into a second main stack a task related to the third screen information while the task related to the first screen information is maintained in the second sub stack.

11. The electronic device of claim 3, wherein:
a third main stack is maintained including application tasks corresponding to tasks included in the second main stack, where each task in the third main stack are configured according to application units; and
a third sub stack is maintained including application tasks corresponding to tasks included in the second sub stack, where each task in the third sub stack are configured according to application units, and the controller is further configured to:
receive an input for moving to the second display an execution screen of an application selected from an application list screen displayed on the first display, wherein the application list screen corresponds to application tasks included in the third main stack;
adjust the second main stack and third main stack so that tasks related to the selected application are deleted from the second and third main stacks for the first display;
insert corresponding tasks related to the selected application into the second and third sub stacks, respectively; and
cause the second display to display the execution screen of the selected application by transmitting a display signal via the wiring unit to the second display.

12. The electronic device of claim 11, wherein the controller is further configured to:
receive a touch input applied to one execution screen in the application list screen displayed on the first display while the execution screen of the selected application is displayed on the second display unit;
adjust the second and third main stacks such that a task related to the one execution screen is located at a top of the second and third main stacks; and
cause the first display to display the one execution screen.

13. The electronic device of claim 3,
wherein the first body and the second body are rotatable with respect to each other between a closed state and an open state,
wherein the electronic device further comprises a third display disposed at a side of the second body opposite the second display, and
wherein the controller is further configured to cause the third display to display information related to an event at the electronic device by transmitting a display signal via the wiring unit to the third display when the event occurs in the closed state of the electronic device.

14. The electronic device of claim 13, wherein the controller is further configured to:
detect switching from the closed state to the open state while the information related to the event is displayed on the third display;
activate the second display;
cause the second display to display screen information corresponding to the event by transmitting a display signal via the wiring unit; and
generate the second and third sub stacks for the second display when the switching to the open state is detected.

15. An electronic device comprising:
a case;
a mobile terminal configured to be coupled with the case and comprising:
a controller;
a connection port provided at one side of the mobile terminal;
a first display; and
wherein the case comprises:
a first body configured to accommodate at least part of the mobile terminal;
a connector protruding inward at one side of the first body and configured to engage with the connection port when the mobile terminal is accommodated at the first body;
a second body comprising a second display; and a wiring unit electrically connecting the first body and the second body and configured to transfer a signal from the mobile terminal to the second display, wherein the controller of the mobile terminal is configured to:
- detect switching from a close state to an open state in which the first display is not covered by the second display;
- activate the first display based on the detection; and
- cause the second display to turn on after the first display is turned on.

16. An electronic device comprising:
- a case;
- a mobile terminal configured to be coupled with the case and comprising:
  - a controller;
  - a connection port provided at one side of the mobile terminal;
  - a first display; and
- wherein the case comprises:
  - a first body configured to accommodate at least part of the mobile terminal;
  - a connector protruding inward at one side of the first body and configured to engage with the connection port when the mobile terminal is accommodated at the first body;
  - a second body comprising a second display; and
  - a wiring unit electrically connecting the first body and the second body and configured to transfer a signal from the mobile terminal to the second display,
- wherein the controller of the mobile terminal is configured to:
  - cause the first display to display first screen information and the second display to display second screen information; and
  - cause the first screen information displayed on the first display to move to the second display when a preset touch gesture is applied to the first display.

17. An electronic device comprising:
- a case;
- a mobile terminal configured to be coupled with the case and comprising:
  - a controller;
  - a connection port provided at one side of the mobile terminal;
  - a first display; and
- wherein the case comprises:
  - a first body configured to accommodate at least part of the mobile terminal;
  - a connector protruding inward at one side of the first body and configured to engage with the connection port when the mobile terminal is accommodated at the first body;
  - a second body comprising a second display, wherein the second body is provided with a third display on a front side of the second body; and
  - a wiring unit electrically connecting the first body and the second body and configured to transfer a signal from the mobile terminal to the second display,
- wherein the controller of the mobile terminal is configured to:
  - output screen information related to an event on the third display in a closed state in which the second display is covered by the first display;
  - activate the second display in response to switching from the closed state to an open state in which the first display unit is not covered by the second display; and
  - output screen information corresponding to the event on the activated second display.

* * * * *